US012067905B2

(12) United States Patent
Dixon

(10) Patent No.: US 12,067,905 B2
(45) Date of Patent: Aug. 20, 2024

(54) SYSTEMS AND METHODS FOR IDENTIFYING ARTICLES OF CLOTHING

(71) Applicant: Jakayla Dixon, Haslet, TX (US)

(72) Inventor: Jakayla Dixon, Haslet, TX (US)

( * ) Notice: Subject to any disclaimer, the term of this patent is extended or adjusted under 35 U.S.C. 154(b) by 0 days.

(21) Appl. No.: 17/348,089

(22) Filed: Jun. 15, 2021

(65) Prior Publication Data

US 2021/0358337 A1 Nov. 18, 2021

Related U.S. Application Data

(63) Continuation of application No. 15/803,012, filed on Nov. 3, 2017, now Pat. No. 11,069,263.

(60) Provisional application No. 62/417,177, filed on Nov. 3, 2016.

(51) Int. Cl.
*G09F 3/02* (2006.01)
*G09F 3/00* (2006.01)

(52) U.S. Cl.
CPC .............. *G09F 3/0297* (2013.01); *G09F 3/02* (2013.01); *G09F 2003/0208* (2013.01); *G09F 2003/0282* (2013.01)

(58) Field of Classification Search
CPC ... A45C 11/18; G09F 3/14; G09F 1/10; G09F 3/18; A41D 13/0012; G06K 19/07749; G06K 19/0723; G06K 19/077; G07F 7/1008; G06Q 20/341
See application file for complete search history.

(56) References Cited

U.S. PATENT DOCUMENTS

| | | | | |
|---|---|---|---|---|
| 6,287,671 | B1 | 9/2001 | Bright et al. | |
| 6,520,544 | B1 | 2/2003 | Mitchell et al. | |
| 7,703,686 | B2 | 4/2010 | Montague | |
| 7,878,400 | B2 | 2/2011 | Harris | |
| D670,918 | S | 11/2012 | Benjamin | |
| 9,262,769 | B2 * | 2/2016 | Bové Bofill | G06Q 30/0225 |
| 9,280,148 | B1 | 3/2016 | Colett et al. | |
| 9,818,007 | B1 | 11/2017 | Bajovic | |
| 2001/0042262 | A1 | 11/2001 | Chu | |

(Continued)

OTHER PUBLICATIONS

Filing receipt and specification for provisional application entitled “Feel the Color,” by Jakayla Robinson, filed Nov. 3, 2016 as U.S. Appl. No. 62/417,177.

*Primary Examiner* — Cassandra Davis
(74) *Attorney, Agent, or Firm* — Barnes & Thornburg LLP; Jerry C. Harris, Jr.

(57) ABSTRACT

Systems and methods for allowing sight impaired or blind persons to identify articles of clothing utilizing “smart labels” which comprise identification information, wherein the identification information is contained in, represented by, or interpretable via raised indicia (e.g., raised lettering or Braille), smart codes, global positioning system (GPS) technology, magnetic stripes, radio frequency identification (RFID) technology, near field communication (NFC) technology, microprocessors, Bluetooth technology, or combinations thereof. These smart labels are unaffected by normal usage such as washing, folding and crumpling to allow sight impaired or blind persons to tactually, or via an electronic interpretation device, e.g., personal computer, a smartphone, computer tablet, magnetic stripe reader, NFC communicator, RFID reader, or Bluetooth device, comprehend the identification information of the smart label.

21 Claims, 26 Drawing Sheets

(56) References Cited

U.S. PATENT DOCUMENTS

| | | | | |
|---|---|---|---|---|
| 2004/0035526 | A1 | 2/2004 | Chamandy et al. | |
| 2004/0206828 | A1 | 10/2004 | Harris | |
| 2006/0137076 | A1 | 6/2006 | Vaughn et al. | |
| 2007/0051816 | A1 | 3/2007 | Chu | |
| 2009/0178311 | A1 | 7/2009 | O'Brien | |
| 2011/0004978 | A1 | 1/2011 | Gwaltney | |
| 2011/0153454 | A1 | 6/2011 | Dunn et al. | |
| 2011/0307309 | A1 | 12/2011 | Forster et al. | |
| 2012/0085828 | A1 | 4/2012 | Ziegler | |
| 2013/0206842 | A1 | 8/2013 | Raz | |
| 2015/0076220 | A1 | 3/2015 | Nelson | |
| 2015/0287251 | A1 | 10/2015 | Hartmann | |
| 2015/0324745 | A1* | 11/2015 | Goodall | G06Q 50/28 705/337 |
| 2017/0337852 | A1 | 11/2017 | Oster | |
| 2017/0344864 | A1 | 11/2017 | Forster | |
| 2020/0126454 | A1 | 4/2020 | Sevaux | |

* cited by examiner

SYSTEMS AND METHODS FOR IDENTIFYING ARTICLES OF CLOTHING

CROSS-REFERENCE TO RELATED APPLICATIONS

This application is a continuation of U.S. patent application Ser. No. 15/803,012, filed Nov. 3, 2017, which claims priority to U.S. Provisional Patent Application No. 62/417,177 filed on Nov. 3, 2016 and entitled "Feel the Color," said applications are incorporated by reference in their entireties.

FIELD OF THE INVENTION

The present disclosure relates to systems and methods for identifying articles of clothing. Particularly, the instant disclosure concerns systems and methods for allowing sight impaired or blind persons to identify articles of clothing. More particularly, this disclosure details clothing labels, i.e., "smart labels," comprising identification information, wherein the identification information is contained in, represented by, or interpretable via raised indicia (e.g., raised lettering or Braille), smart codes, magnetic stripes, radio frequency identification (RFID) technology (e.g., RFID tag), near field communication technology, global positioning system (GPS) technology e.g., GPS chip), processors (e.g., microprocessor), Bluetooth technology, or combinations thereof. These smart labels are unaffected by normal usage such as laundering, cleaning, pressing, washing, folding, and wearing to allow sight impaired or blind persons to tactually and/or via an electronic interpretation device, e.g., personal computer, a smartphone, computer tablet, magnetic stripe reader, NFC communicator, RFID reader, comprehend the identification information of the smart label. The systems and methods disclosed herein also provide sight impaired persons, and others, the ability to discern color relationships, style relationships, environmental concerns, wear history, and cleaning recommendations via the interpretation of the smart labels associated with particular articles of clothing.

BACKGROUND OF THE INVENTION

Sight impaired or blind people face many challenges and obstacles as they seek to function as sighted persons in society. One problem area usually overlooked is clothing and fashion. Clothing is mandated to include labels listing the fabric(s) from which the specific article of clothing is made. The labels may also include care instructions for cleaning or laundering. For the visually impaired such labels cannot be deciphered without assistance. Moreover, such labels do not indicate the specific article of clothing, the color, the cut, or the style of the clothing as this information is readily apparent to those not visually impaired.

Many times the visually impaired pin Braille comprising slips of paper or plastic to articles of clothing to identify their clothes so that they can identify their clothing. However, these makeshift labels must either be removed each time the clothing is worn or washed, or else normal usage, such as folding, crumpling or washing, degrades or destroys the label so that they no longer are decipherable.

What is needed is a system and method which will allow visually impaired persons to independently identify articles of clothing and make wardrobe decisions based on information independently acquired.

SUMMARY OF THE INVENTION

The present disclosure provides systems and methods utilizing smart labels comprising raised indicia, smart codes (e.g., a UPC bar code or matrix code (e.g., a QR code)), global positioning system (GPS) technology (e.g., a GPS chip), magnetic stripes, rewriteable magnetic stripes, radio frequency identification (RFID) technology (e.g., RFID tags), near field communication (NFC) technology (e.g., NFC chips), processors (e.g., microprocessors), Bluetooth technology, (collectively, information conveyors) or combinations thereof, to encode, convey, and/or associate the smart labels with information concerning the articles of clothing to which the smart labels are attached.

The present disclosure provides a method for identifying an article of clothing comprising: providing an interpretable component, wherein the interpretable component comprises raised indicia, a smart code, a GPS chip, a magnetic stripe, a rewritable magnetic stripe, a radio frequency identification (RFID) tag, near field communication (NFC) chip, a processor, Bluetooth technology, or combinations thereof; and providing the label affixable to the article of clothing, wherein the interpretable component encodes and/or associates the label with data specific to the article of clothing.

Another object of the present disclosure is to provide a smart label system wherein the wear history of the article of clothing to which a smart label is affixed is recorded, maintained, stored, and accessible. Such wear history can provide the user the ability to choose articles of clothing based on a desire to avoid appearing in the same location and/or on the same day of the week wearing the same articles of clothing that the user previously wore at such location and/or day. Another limitation with non-smart labels is that when clothing is initially purchased, the non-smart labels cannot be deciphered without sight. Thus the visually impaired person must have assistance in choosing the proper size, color, cut, style, and coordinates from a friend, family member, salesperson, or stranger at the point of purchase. Not only is this inconvenient, but it constrains the independence and freedom for the visually impaired person. In any event, the visually impaired person must then prepare the necessary make-shift tactile labels for the articles of clothing purchased.

Accordingly, it is an object of the present disclosure to provide a smart label system having raised indicia, smart codes, magnetic stripes, GPS technology, RFID technology, NFC technology, processors, Bluetooth technology, or combinations thereof which are capable of encoding and/or conveying information concerning certain characteristics of the article of clothing to which the label is permanently affixed that allows visually impaired persons to interpret the smart labels to comprehend the encoded, associated, and/or conveyed information.

Another object of the present disclosure is to provide a smart label system having raised indicia, smart codes, magnetic stripes, GPS technology, RFID technology, NFC technology, microprocessors, Bluetooth technology, or combinations thereof which are capable of encoding and/or conveying information concerning certain characteristics of the article of clothing to which the label is affixed that allows visually impaired persons to interpret the smart labels to comprehend the encoded, associated, and/or conveyed information. In such an embodiment, selectable smart labels may be utilized by a user based on designated to encoded and/or conveyable information and the user may affix the selectable smart label to an article of clothing either permanently or temporarily.

Another object of the present disclosure is to provide a smart label system having raised indicia, smart codes, magnetic stripes, GPS technology, RFID technology, NFC technology, microprocessors, Bluetooth technology, or combinations thereof which are capable of encoding and/or conveying information concerning certain characteristics of the article of clothing to which the label is affixed that allows visually impaired persons to interpret the smart labels to comprehend the encoded and/or conveyed information. In such an embodiment, smart labels may be customized by a user to encode and/or convey user desired information and the user may affix the customized smart label to an article of clothing either permanently or temporarily.

BRIEF DESCRIPTION OF THE DRAWINGS

For a more complete understanding of the invention, reference is hereby made to the following drawings.

DETAILED DESCRIPTION

Figure 1A:
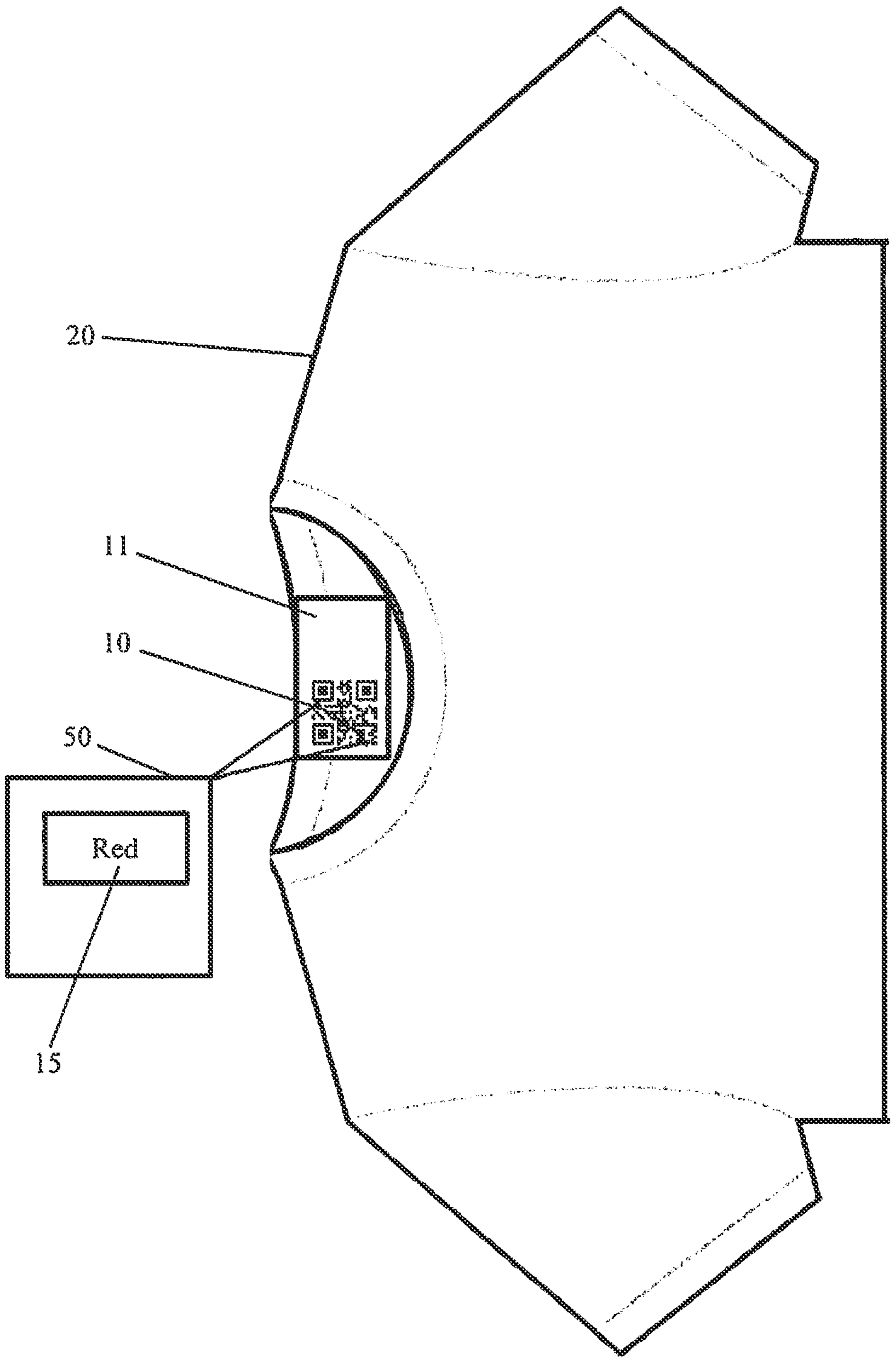
FIG. 1A is a view of an article of clothing comprising a smart label in accordance with the present disclosure.
Figure 1B:
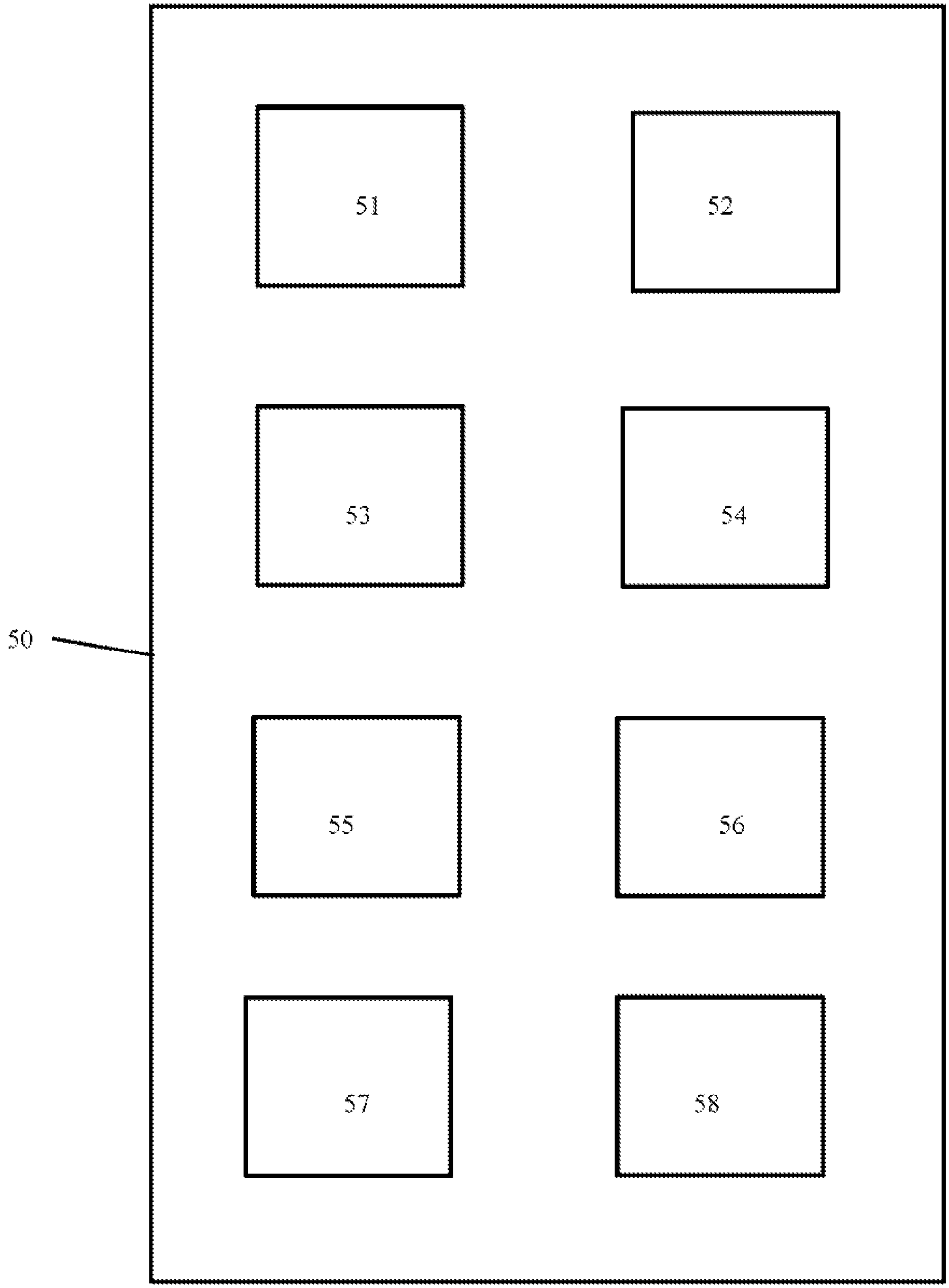
FIG. 1B depicts the interpretation devices of the present disclosure.

As shown in FIG. 1A, the present disclosure provides systems and methods for identifying an article of clothing 20 comprising providing a smart label 11 comprising an interpretable component 10, which encodes and/or associates article of clothing specific data 15, which may be interpreted by an interpretation device 50. The interpretable component 10 may comprise: raised indicia 110; a smart code 210; an NFC chip 310; a magnetic stripe 410; a rewritable magnetic stripe 510; an RFID tag 610; a GPS chip 910; a processor 1010; Bluetooth technology 1110; or combinations thereof. The provided smart label 10 being affixable to the article of clothing 20, wherein the smart label 10 encodes and/or associates the interpretable component 10 with article of clothing specific data 15 to which the smart label 11 is affixed; and providing an interpretation device 50. As shown in FIG. 1B, interpretation device 50 may comprise a personal computer 51, a smartphone 52, a computer tablet 53, a smart code reader 54, an NFC communicator 55, an RFID reader 56, a magnetic stripe reader 57, a Bluetooth communicator 58, or combinations thereof. The interpretation device 50 provides a user or beneficiary of the interpretation device 50 the article of clothing specific data 15 to which the smart label 11 is affixed.

In an embodiment, a smart label of the instantly disclosed system may be permanently affixed to an article of clothing. In a permanently affixed embodiment, a smart label may be sewn, stitched, glued, riveted, stapled, or combinations thereof to an article of clothing.

In an embodiment, a smart label of the instantly disclosed system may be temporarily affixed to an article of clothing. In a temporarily affixed embodiment, a smart label may be affixed to an article of clothing via a zipper, a snap, a hook and loop fastener, a pin, a button, or combinations thereof. In an embodiment, a temporarily affixed smart label is removable and reaffixable.

In an embodiment, a smart label of the instantly disclosed system may be fashioned from a natural product, a synthetic product, a composite product, a metal, and alloy, a polymer, or combinations thereof.

Figure 1C:
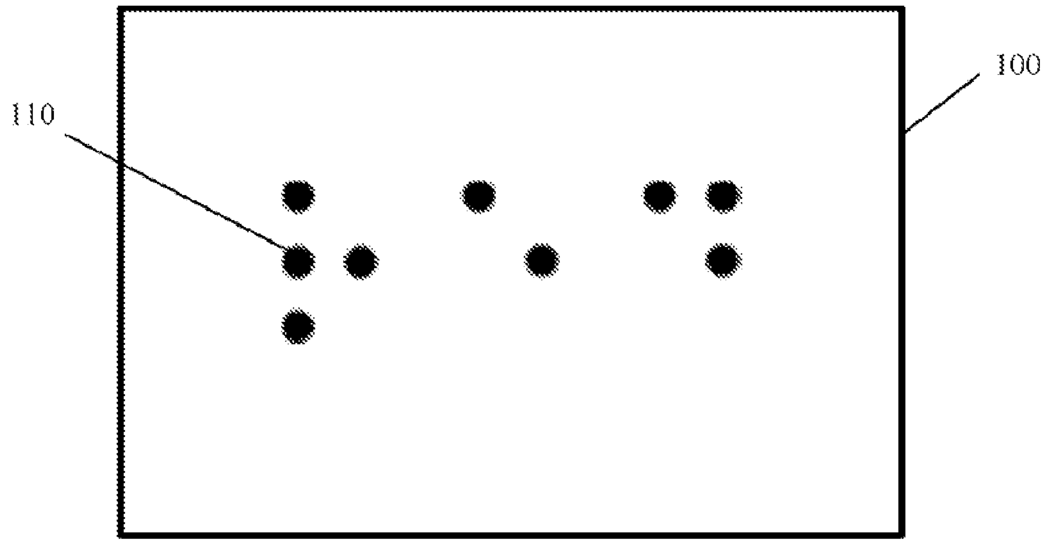
FIG. 1C is a view of a smart label comprising Braille indicia in accordance with the present disclosure.
Figure 1D:
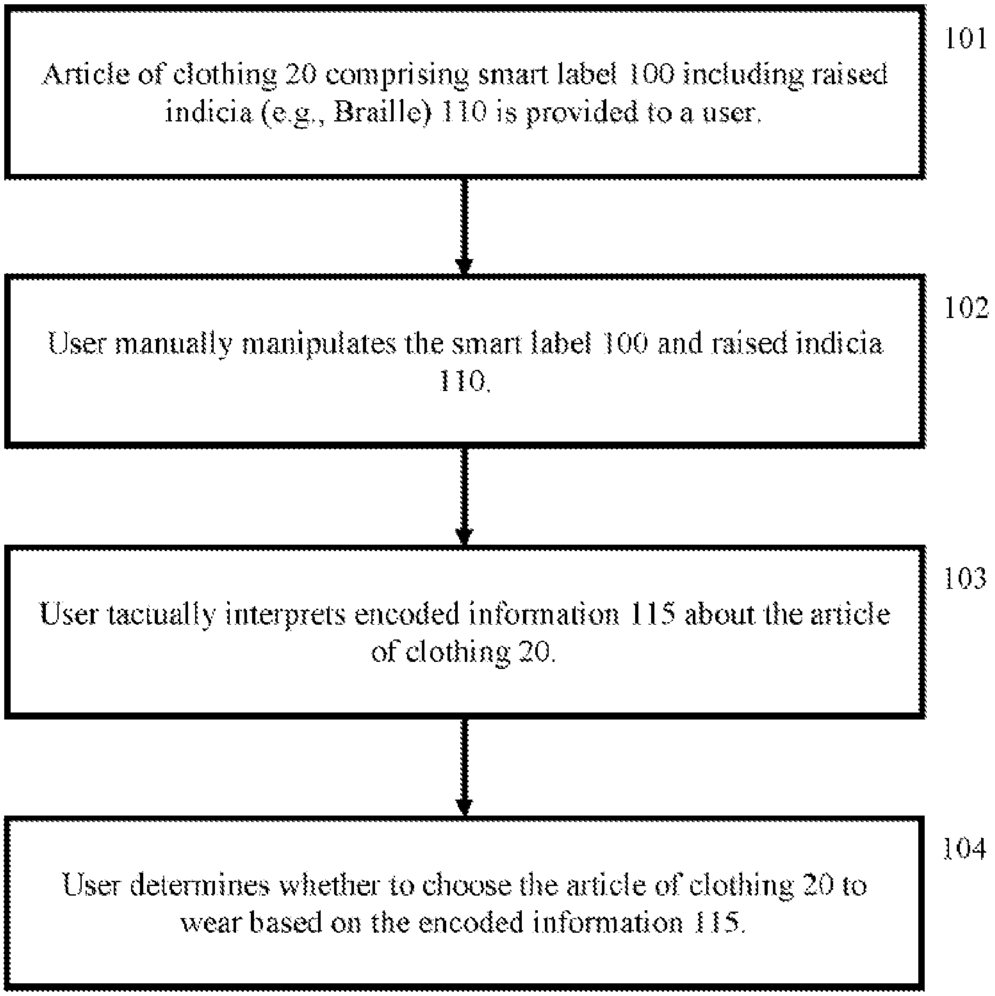
FIG. 1D is a flow chart illustrating the interpretation of information encoded in a smart label.

As shown in FIG. 1C, in an embodiment, smart label 100 includes raised indicia (e.g., Braille) 110. In an embodiment, the raised indicia 110 may be the same color as a color of the article of clothing 20 to which the smart label 100 is affixed. For example, if the article of clothing 20 is predominately red, the raised indicia 110 may be red. In an alternative embodiment, the raised indicia 110 may not be the same color as a color of the article of clothing 20 to which to the smart label 100 is affixed. For example, if the article of clothing 20 is green, the raised indicia 110 may be black. In an embodiment, the raised indicia 110 can encode information 115 concerning the article of clothing 20 such as: color, size, style, appearance (e.g., images, symbols, and/or verbiage present on article), cleaning and/or laundering instructions, designer, manufacturer, merchant, place of purchase, country of origin, or combinations thereof. The raised indicia 110 is tactually interpretable.

As shown in FIG. ID, in an embodiment, at 101, an article of clothing 20 comprising smart label 100 including raised indicia (e.g., Braille) 110 is provided to a user. At 102, the user manually manipulates the smart label 100 and raised indicia 110. At 103, the user tactually interprets encoded information 115 about the article of clothing 20. At 104, the user determines whether to choose the article of clothing 20 to wear based on the encoded information 115.

Figure 2A:
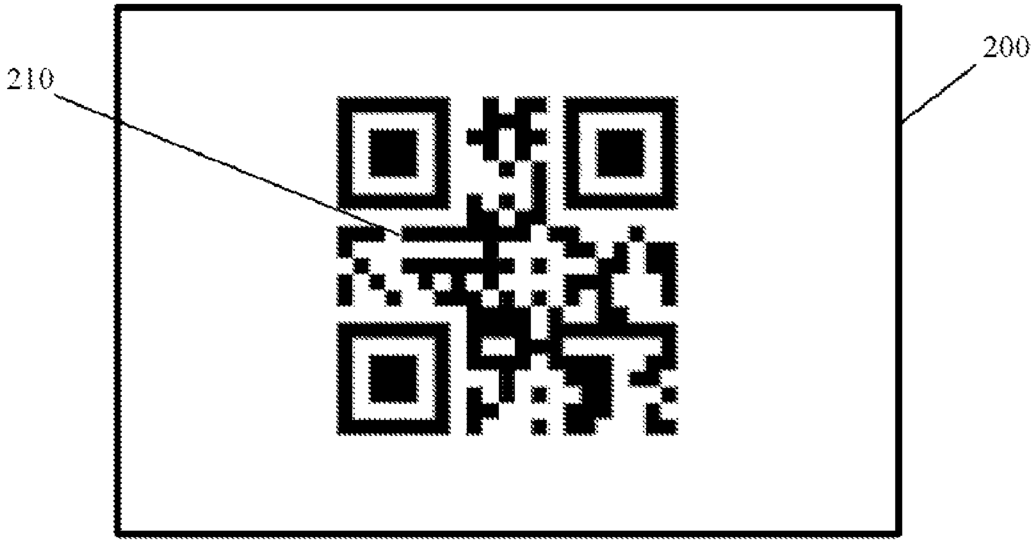
FIG. 2A is view of a smart label comprising a matrix code in accordance with the present disclosure.

As shown in FIG. 2A, in an embodiment, smart label 200 includes a smart code (e.g., a matrix code) 210. In an embodiment, the matrix code 210 can encode information 215 concerning the article of clothing 20 such as: color, size, style, appearance (e.g., images, symbols, and/or verbiage present on article), cleaning and/or laundering instructions, designer, manufacturer, merchant, place of purchase, country of origin, or combinations thereof. The matrix code's encoded information 215 is electronically interpretable by a smart code interpretation device 250 as described above, e.g., a smartphone 52 comprising a smart code reader application and/or a dedicated smart code reader 54. The matrix code's encoded information 215 may be modified or deleted via the use of a smart code programmer/encoder as is known to those of ordinary skill in the art. In an embodiment, a user may modify the matrix code's encoded information 215 to encode correlated information 255 comprising article of clothing wear history information (e.g., GPS chip's encoded information 915) which is correlated with article of clothing color, size, style, appearance (e.g., images, symbols, and/or verbiage present on article), cleaning and/or laundering instructions, designer, manufacturer, merchant, place of purchase, country of origin, or combinations thereof, information 215. In an embodiment, the correlated information 255 may be correlated by the interpretation device 250 and/or other device such as a personal computer 51 or tablet 53. In an embodiment, the correlated information 255 may be programmed/encoded onto the matrix code 210 by the interpretation device 250 and/or other device such as a personal computer 51 or tablet 53. In an embodiment, the correlated information 255 may be correlated automatically by the smart label 200 (or a processor 201 integrated within the smart label 200). In an embodiment, the correlated information 255 may be encoded onto the matrix code 210 automatically by the smart label 200 (or a processor 201 integrated within the smart label 200). The correlated information 255 may be accessed by a user of the interpretation device 250 to determine wear history for an article of clothing 20 to which the smart label 200 is affixed.

In an alternative embodiment, smart label 200 includes a smart code (e.g., a matrix code) 210. In an embodiment, the matrix code 210 is associated (e.g., in a database) with information 215 concerning the article of clothing 20 such as: color, size, style, appearance (e.g., images, symbols, and/or verbiage present on article), cleaning and/or laundering instructions, designer, manufacturer, merchant, place of purchase, country of origin, or combinations thereof. The matrix code 210 is electronically interpretable and/or accessible by a smart code interpretation device 250 as described above, e.g., a smartphone 52 comprising a smart code reader application and/or a dedicated smart code reader 54. The matrix code's 210 associated information 215 may be modified or deleted via the use of a smart code programmer/encoder as is known to those of ordinary skill in the art. In an embodiment, a user may modify the information 215 to include correlated information 255 comprising article of clothing wear history information (e.g., GPS chip's encoded information 915) which is correlated with article of clothing color, size, style, appearance (e.g., images, symbols, and/or verbiage present on article), cleaning and/or laundering instructions, designer, manufacturer, merchant, place of purchase, country of origin, or combinations thereof, information 215. In an embodiment, the correlated information 255 may be correlated by the interpretation device 250 and/or other device such as a personal computer 51 or tablet 53. In an embodiment, the correlated information 255 may be associated with the matrix code 210 by the interpretation device 250 and/or other device such as a personal computer 51 or tablet 53. In an embodiment, the correlated information 255 may be correlated automatically by the smart label 200 (or a processor 201 integrated within the smart label 200). In an embodiment, the correlated information 255 may be associated with matrix code 210 automatically by the smart label 200 (or a processor 201 integrated within the smart label 200). The correlated information 255 may be accessed by a user of the interpretation device 250 to determine wear history for an article of clothing 20 to which the smart label 200 is affixed.

Figure 2B:
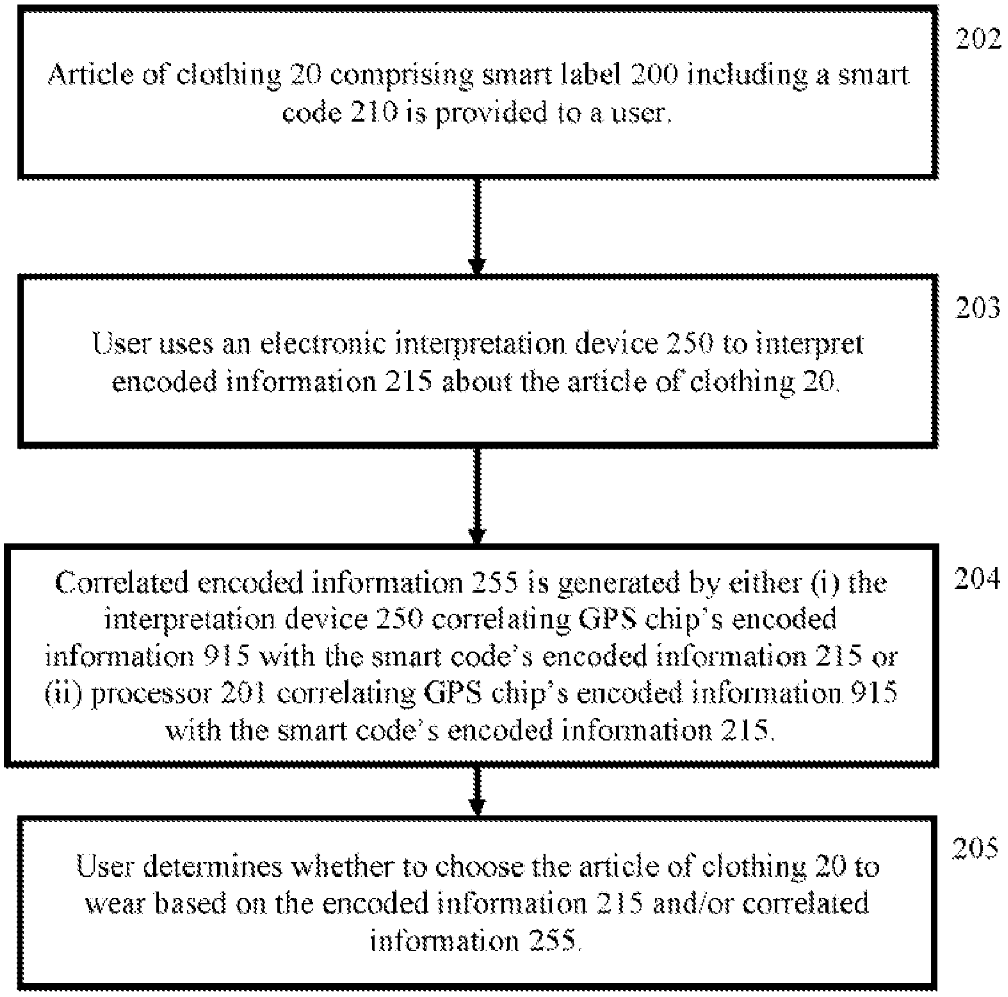
FIG. 2B is a flow chart illustrating the interpretation of information encoded in a smart label.

As shown in FIG. 2B, in an embodiment, at 202 an article of clothing 20 comprising smart label 200 including a smart code 210 is provided to a user. At 203, the user uses an electronic interpretation device 250 to interpret encoded information 215 about the article of clothing 20. At 204, correlated encoded information 255 is generated by either (i) the interpretation device 250 correlating GPS chip's encoded information 915 with the smart code's encoded information 215 or (ii) processor 201 correlating GPS chip's encoded information 915 with the smart code's encoded information 215. At 205, the user determines whether to choose the article of clothing 20 to wear based on the encoded information 215 and/or the correlated information 255.

Figure 3A:
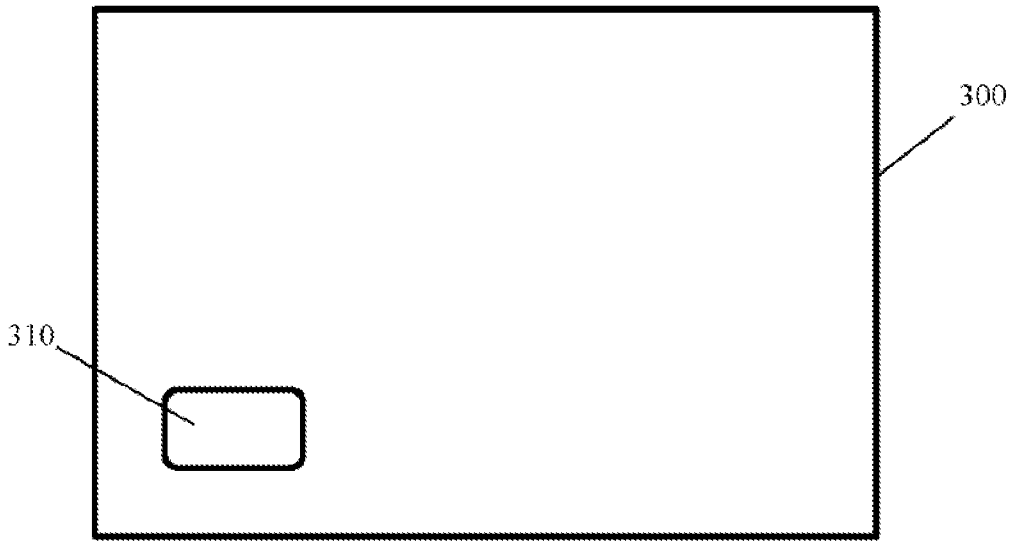
FIG. 3A is a view of a smart label comprising an NFC chip in accordance with the present disclosure.

As shown in FIG. 3A, in an embodiment, smart label 300 includes a near field communication component (e.g., an NFC chip) 310. In an embodiment, the NFC chip 310 can encode information 315 concerning the article of clothing 20 such as: color, size, style, appearance (e.g., images, symbols, and/or verbiage present on article), cleaning and/or laundering instructions, designer, manufacturer, merchant, place of purchase, country of origin, or combinations thereof. The NFC chip's encoded information 315 is electronically interpretable by an NCF chip interpretation device 350 as described above, e.g., a smartphone 52 comprising an NFC communicator 55 and/or a dedicated NFC communicator 55. NFC chip's encoded information 315 may be modified or deleted via the use of an NFC programmer/encoder as is known to those of ordinary skill in the art. In an embodiment, a user may modify the NFC chip's encoded information 315 to encode correlated information 355 comprising article of clothing wear history information (e.g., GPS chip's encoded information 915) which is correlated with article of clothing color, size, style, appearance (e.g., images, symbols, and/or verbiage present on article), cleaning and/or laundering instructions, designer, manufacturer, merchant, place of purchase, country of origin, or combinations thereof information 315. In an embodiment, the correlated information 355 may be correlated by the interpretation device 350 and/or other device such as a personal computer 51 or tablet 53. In an embodiment, the correlated information 355 may be programmed/encoded onto the NFC chip 310 by the interpretation device 350 and/or other device such as a personal computer 51 or tablet 53. In an embodiment, the correlated information 355 may be correlated automatically by the smart label 300 (or a processor 301 integrated within the smart label 300). In an embodiment, the correlated information 355 may be encoded onto the NFC chip 310 automatically by the smart label 300 (or a processor 301 integrated within the smart label 300). The correlated information 355 may be accessed by a user of the interpretation device 350 to determine wear history for an article of clothing 20 to which the smart label 300 is affixed.

In an alternative embodiment, smart label 300 includes a near field communication component (e.g., an NFC chip) 310. In an embodiment, the NFC chip 310 can be associated (e.g., in a database) with information 315 concerning the article of clothing 20 such as: color, size, style, appearance (e.g., images, symbols, and/or verbiage present on article), cleaning and/or laundering instructions, designer, manufacturer, merchant, place of purchase, country of origin, or combinations thereof. The NFC chip's associated information 315 is electronically interpretable and/or accessible by an NCF chip interpretation device 350 as described above, e.g., a smartphone 52 comprising an NFC communicator 55 and/or a dedicated NFC communicator 55. NFC chip's associated information 315 may be modified or deleted via the use of an NFC programmer/encoder as is known to those of ordinary skill in the art. In an embodiment, a user may modify the NFC chip's associated information 315 to include correlated information 355 comprising article of clothing wear history information (e.g., GPS chip's encoded information 915) which is correlated with article of clothing color, size, style, appearance (e.g., images, symbols, and/or verbiage present on article), cleaning and/or laundering instructions, designer, manufacturer, merchant, place of purchase, country of origin, or combinations thereof information 315. In an embodiment, the correlated information 355 may be correlated by the interpretation device 350 and/or other device such as a personal computer 51 or tablet 53. In an embodiment, the correlated information 355 may be associated with the NFC chip 310 by the interpretation device 350 and/or other device such as a personal computer 51 or tablet 53. In an embodiment, the correlated information 355 may be correlated automatically by the smart label 300 (or a processor 301 integrated within the smart label 300). In an embodiment, the correlated information 355 may be associated with the NFC chip 310 automatically by the smart label 300 (or a processor 301 integrated within the smart label 300). The correlated information 355 may be accessed by a user of the interpretation device 350 to determine wear history for an article of clothing 20 to which the smart label 300 is affixed.

Figure 3B:
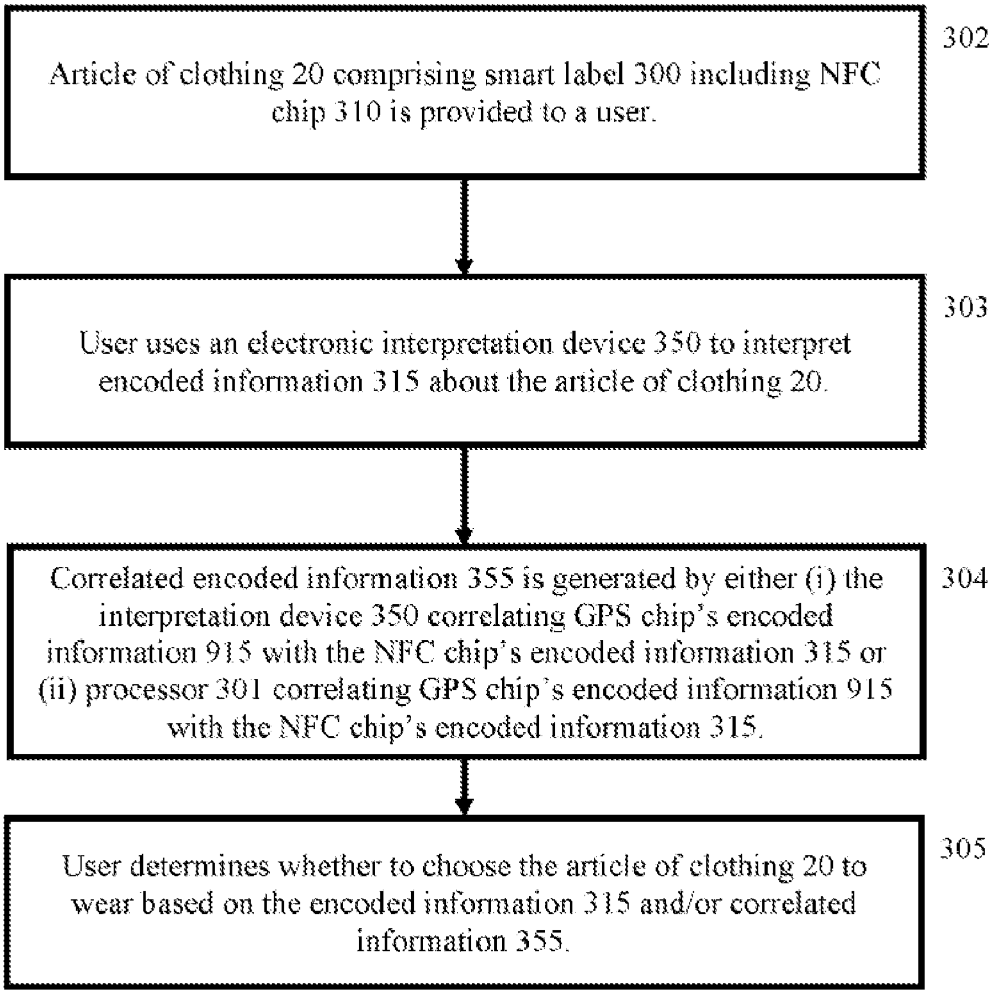
FIG. 3B is a flow chart illustrating the interpretation of information encoded in a smart label.

As shown in FIG. 3B, in an embodiment, at 302 an article of clothing 20 comprising smart label 300 including NFC chip 310 is provided to a user. At 303, the user uses an electronic interpretation device 350 to interpret encoded information 315 about the article of clothing 20. At 304, correlated encoded information 355 is generated by either (i) the interpretation device 350 correlating GPS chip's encoded information 915 with the NFC chip's encoded information 315 or (ii) processor 301 correlating GPS chip's encoded information 915 with the NFC chip's encoded information 315. At 305, the user determines whether to choose the article of clothing 20 to wear based on the encoded information 315 and/or the correlated information 355.

Figure 4A:
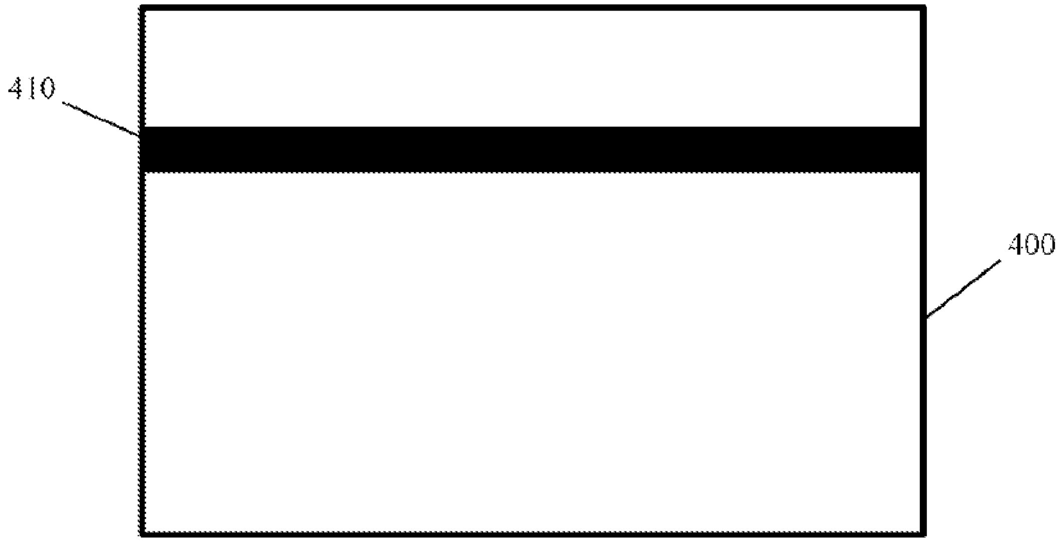
FIG. 4A is view of a smart label comprising a magnetic stripe in accordance with the present disclosure.

As shown in FIG. 4A, in an embodiment, smart label 400 includes a magnetic stripe 410. In an embodiment, the magnetic stripe 410 can encode information 415 concerning the article of clothing 20 such as: color, size, style, appearance (e.g., images, symbols, and/or verbiage present on article), cleaning and/or laundering instructions, designer, manufacturer, merchant, place of purchase, country of origin, or combinations thereof. The magnetic stripe's encoded information 415 is electronically interpretable by a magnetic stripe interpretation device 450 as described above, e.g., a smartphone 52 comprising a magnetic stripe reader 57 and/or a dedicated magnetic stripe reader 57.

In an alternative embodiment, smart label 400 includes a magnetic stripe 410. In an embodiment, the magnetic stripe 410 can be associated (e.g., in a database) with information 415 concerning the article of clothing 20 such as: color, size, style, appearance (e.g., images, symbols, and/or verbiage present on article), cleaning and/or laundering instructions, designer, manufacturer, merchant, place of purchase, country of origin, or combinations thereof. The magnetic stripe's associated information 415 is electronically interpretable and/or accessible by a magnetic stripe interpretation device 450 as described above, e.g., a smartphone 52 comprising a magnetic stripe reader 57 and/or a dedicated magnetic stripe reader 57. The magnetic stripe's associated information 415 may be correlated in the database to be correlated information 455 comprising article of clothing wear history information (e.g., GPS chip's encoded information 915). In an embodiment, the correlated information 455 may be correlated by the interpretation device 450 and/or other device such as a personal computer 51 or tablet 53. In an embodiment, the correlated information 455 may be associated with the magnetic stripe 415 by the interpretation device 450 and/or other device such as a personal computer 51 or tablet 53. In an embodiment, the correlated information 455 may be correlated automatically by the smart label 400 (or a processor 401 integrated within the smart label 400). In an embodiment, the correlated information 455 may be associated with the magnetic stripe 410 automatically by the smart label 400 (or a processor 401 integrated within the smart label 400). The correlated information 455 may be accessed by a user of the interpretation device 450 to determine wear history for an article of clothing to which the smart label is affixed.

Figure 4B:
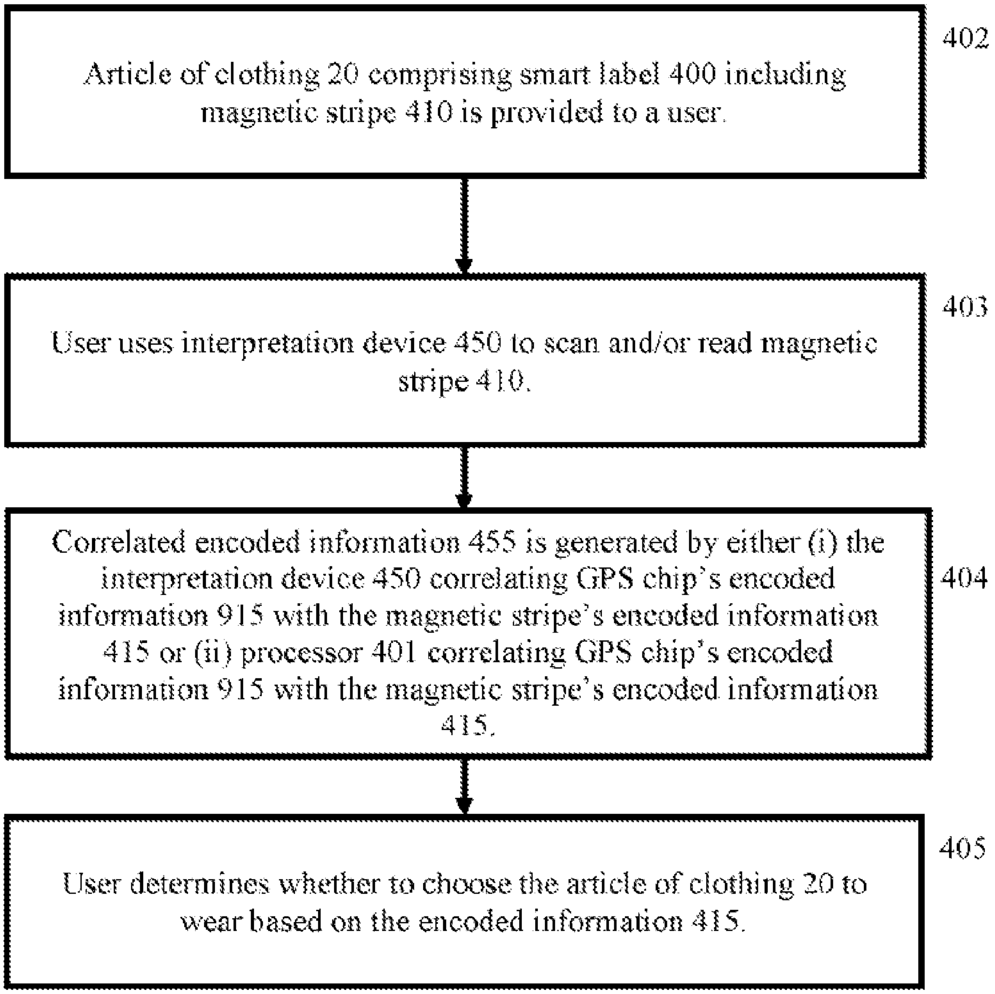
FIG. 4B is a flow chart illustrating the interpretation of information encoded in a smart label.

As shown in FIG. 4B, in an embodiment, at 402 an article of clothing 20 comprising smart label 400 including magnetic stripe 410 is provided to a user. At 403, the user uses an electronic interpretation device 450 to interpret encoded information 415 about the article of clothing 20. At 404, correlated encoded information 455 is generated by either (i) the interpretation device 450 correlating GPS chip's encoded information 915 with the magnetic stripe's encoded information 415 or (ii) processor 401 correlating GPS chip's encoded information 915 with the magnetic stripe's encoded information 415. At 405, the user determines whether to choose the article of clothing 20 to wear based on the encoded information 415 and/or the correlated information 455.

Figure 5A:
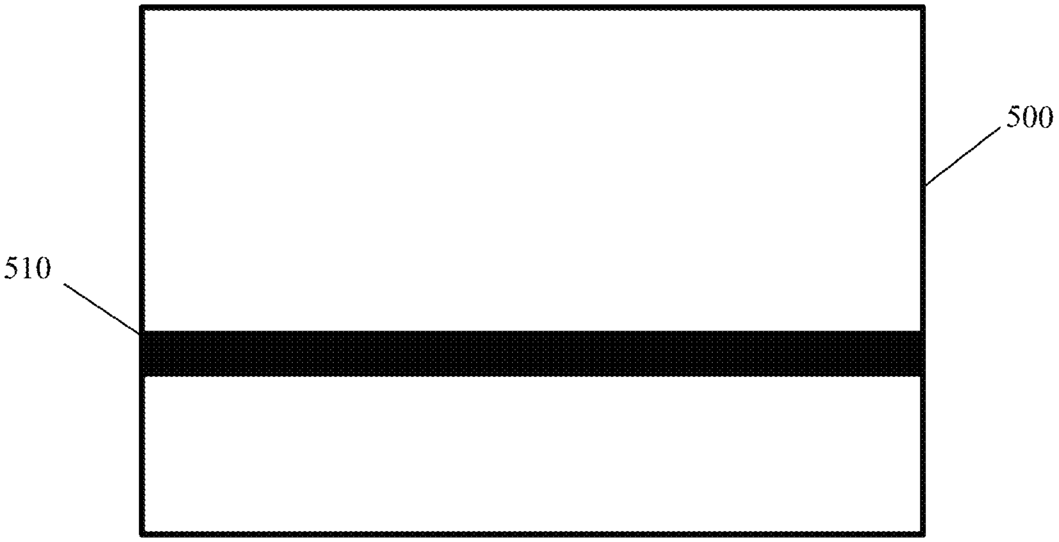
FIG. 5A is view of a smart label comprising a rewritable magnetic stripe in accordance with the present disclosure.

As shown in FIG. 5A, in an embodiment, smart label 500 includes a rewritable magnetic stripe 510. In an embodiment, the magnetic stripe 500 can encode information 515 concerning the article of clothing 20 such as: color, size, style, appearance (e.g., images, symbols, and/or verbiage present on article), cleaning and/or laundering instructions, designer, manufacturer, merchant, place of purchase, country of origin, or combinations thereof. The rewritable magnetic stripe's encoded information 515 is electronically interpretable by a magnetic stripe interpretation device 550 as described above, e.g., a smartphone 52 comprising a magnetic stripe reader 57 and/or a dedicated magnetic stripe reader 57. The rewritable magnetic stripe's encoded information 515 may be modified or deleted via the use of a rewritable magnetic stripe encoder as is known to those of ordinary skill in the art. In an embodiment, a user may modify the rewritable magnetic stripe's encoded information 515 to encode correlated information 555 comprising article of clothing wear history information (e.g., GPS chip's encoded information 915) which is correlated with article of clothing color, size, style, appearance (e.g., images, symbols, and/or verbiage present on article), cleaning and/or laundering instructions, designer, manufacturer, merchant, place of purchase, country of origin, or combinations thereof information 515. In an embodiment, the correlated information 555 may be correlated by the interpretation device 550 and/or other device such as a personal computer 51 or tablet 53. In an embodiment, the correlated information 555 may be encoded onto the rewritable magnetic stripe 515 by the interpretation device 550 and/or other device such as a personal computer 51 or tablet 53. In an embodiment, the correlated information 555 may be correlated automatically by the smart label 500 (or a processor 501 integrated within the smart label 500). In an embodiment, the correlated information 555 may be encoded onto the rewritable magnetic stripe 510 automatically by the smart label 500 (or a processor 501 integrated within the smart label 500). The correlated information 555 may be accessed by a user of the interpretation device 550 to determine wear history for an article of clothing to which the smart label is affixed.

In an alternative embodiment, smart label 500 includes a rewritable magnetic stripe 510. In an embodiment, the magnetic stripe 510 can be associated (e.g., in a database) with information 515 concerning the article of clothing 20 such as: color, size, style, appearance (e.g., images, symbols, and/or verbiage present on article), cleaning and/or laundering instructions, designer, manufacturer, merchant, place of purchase, country of origin, or combinations thereof. The rewritable magnetic stripe's associated information 515 is electronically interpretable and/or accessible by a magnetic stripe interpretation device 550 as described above, e.g., a smartphone 52 comprising a magnetic stripe reader 57 and/or a dedicated magnetic stripe reader 57. The rewritable magnetic stripe's associated information 515 may be modified or deleted via the use of a rewritable magnetic stripe encoder as is known to those of ordinary skill in the art. In an embodiment, a user may modify the rewritable magnetic stripe's associated information 515 to include correlated information 555 comprising article of clothing wear history information (e.g., GPS chip's encoded information 915) which is correlated with article of clothing color, size, style, appearance (e.g., images, symbols, and/or verbiage present on article), cleaning and/or laundering instructions, designer, manufacturer, merchant, place of purchase, country of origin, or combinations thereof information 515. In an embodiment, the correlated information 555 may be correlated by the interpretation device 550 and/or other device such as a personal computer 51 or tablet 53. In an embodiment, the correlated information 555 may be associated with the rewritable magnetic stripe 515 by the interpretation device 550 and/or other device such as a personal computer 51 or tablet 53. In an embodiment, the correlated information 555 may be correlated automatically by the smart label 500 (or a processor 501 integrated within the smart label 500). In an embodiment, the correlated information 555 may be associated with the rewritable magnetic stripe 510 automatically by the smart label 500 (or a processor 501 integrated within the smart label 500). The correlated information 555 may be accessed by a user of the interpretation device 550 to determine wear history for an article of clothing to which the smart label is affixed.

Figure 5B:
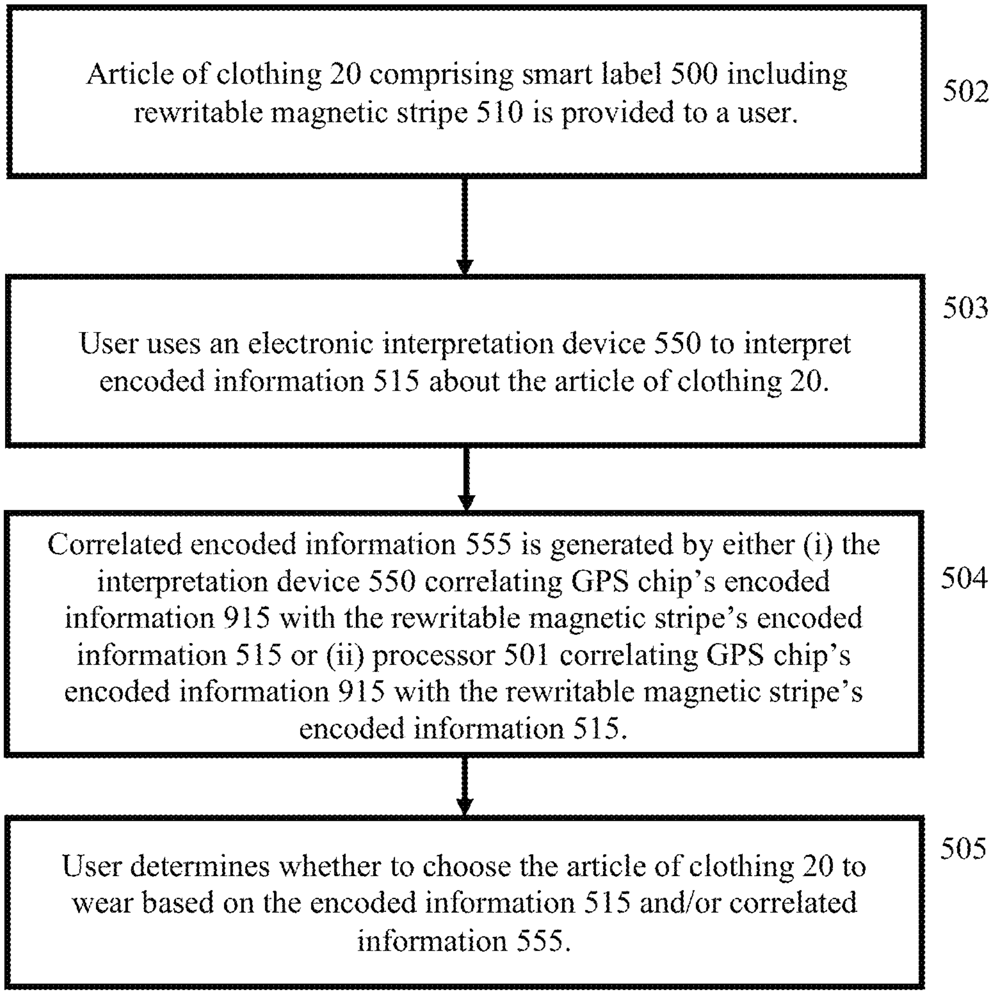
FIG. 5B is a flow chart illustrating the interpretation of information encoded in a smart label.

As shown in FIG. 5B, in an embodiment, at 502 an article of clothing 20 comprising smart label 500 including rewritable magnetic stripe 510 is provided to a user. At 503, the user uses an electronic interpretation device 550 to interpret encoded information 515 about the article of clothing 20. At 504, correlated encoded information 555 is generated by either (i) the interpretation device 550 correlating GPS chip's encoded information 915 with the rewritable magnetic stripe's encoded information 515 or (ii) processor 501 correlating GPS chip's encoded information 915 with the rewritable magnetic stripe's encoded information 515. At 505, the user determines whether to choose the article of clothing 20 to wear based on the encoded information 515 and/or the correlated information 555.

Figure 6A:
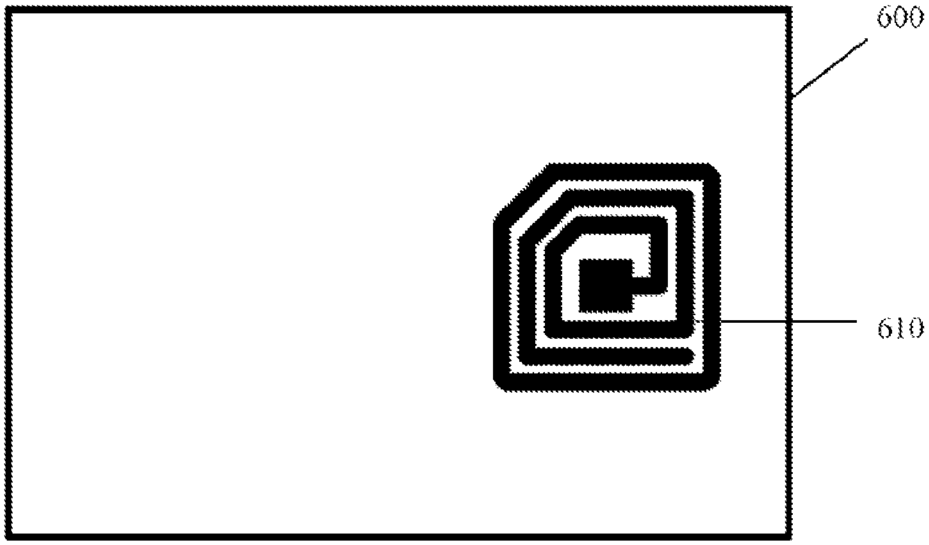
FIG. 6A is view of a smart label comprising an RFID tag in accordance with the present disclosure.

As shown in FIG. 6A, in an embodiment, smart label 600 includes an RFID tag 610. In an embodiment, the RFID tag 610 can encode information 615 concerning the article of clothing 20 such as: color, size, style, appearance (e.g., images, symbols, and/or verbiage present on article), cleaning and/or laundering instructions, designer, manufacturer, merchant, place of purchase, country of origin, or combinations thereof. The RFID tag's encoded information 615 is electronically interpretable by an RFID tag interpretation device 650 as described above, e.g., a smartphone 52 comprising an RFID tag reader 56 and/or a dedicated RFID tag reader 56. The RFID tag's encoded information 615 may be modified or deleted via the use of an RFID tag encoder as is known to those of ordinary skill in the art. In an embodiment, a user may modify the RFID tag's encoded information 615 to encode correlated information 655 comprising article of clothing wear history information (e.g., GPS chip's encoded information 915) which is correlated with article of clothing color, size, style, appearance (e.g., images, symbols, and/or verbiage present on article), cleaning and/or laundering instructions, designer, manufacturer, merchant, place of purchase, country of origin, or combinations thereof, information 615. In an embodiment, the correlated information 655 may be correlated by the interpretation device 650 and/or other device such as a personal computer 51 or tablet 53. In an embodiment, the correlated information 655 may be encoded onto the RFID tag 610 by the interpretation device 650 and/or other device such as a personal computer 51 or tablet 53. In an embodiment, the correlated information 655 may be correlated automatically by the smart label 600 (or a processor 601 integrated within the smart label 600). In an embodiment, the correlated information 655 may be encoded onto the RFID tag 610 automatically by the smart label 600 (or a processor 601 integrated within the smart label 600). The correlated information 655 may be accessed by a user of the interpretation device 650 to determine wear history for an article of clothing to which the smart label is affixed.

In an alternative embodiment, smart label 600 includes an RFID tag 610. In an embodiment, the RFID tag 610 can be associated with (e.g., in a database) with information 615 concerning the article of clothing 20 such as: color, size, style, appearance (e.g., images, symbols, and/or verbiage present on article), cleaning and/or laundering instructions, designer, manufacturer, merchant, place of purchase, country of origin, or combinations thereof. The RFID tag's associated information 615 is electronically interpretable by an RFID tag interpretation device 650 as described above, e.g., a smartphone 52 comprising an RFID tag reader 56 and/or a dedicated RFID tag reader 56. The RFID tag's associated information 615 may be modified or deleted via the use of an RFID tag encoder as is known to those of ordinary skill in the art. In an embodiment, a user may modify the RFID tag's associated information 615 to include correlated information 655 comprising article of clothing wear history information (e.g., GPS chip's encoded information 915) which is correlated with article of clothing color, size, style, appearance (e.g., images, symbols, and/or verbiage present on article), cleaning and/or laundering instructions, designer, manufacturer, merchant, place of purchase, country of origin, or combinations thereof, information 615. In an embodiment, the correlated information 655 may be correlated by the interpretation device 650 and/or other device such as a personal computer 51 or tablet 53. In an embodiment, the correlated information 655 may be associated with the RFID tag 610 by the interpretation device 650 and/or other device such as a personal computer 51 or tablet 53. In an embodiment, the correlated information 655 may be correlated automatically by the smart label 600 (or a processor 601 integrated within the smart label 600). In an embodiment, the correlated information 655 may be associated with the RFID tag 610 automatically by the smart label 600 (or a processor 601 integrated within the smart label 600). The correlated information 655 may be accessed by a user of the interpretation device 650 to determine wear history for an article of clothing to which the smart label is affixed.

Figure 6B:
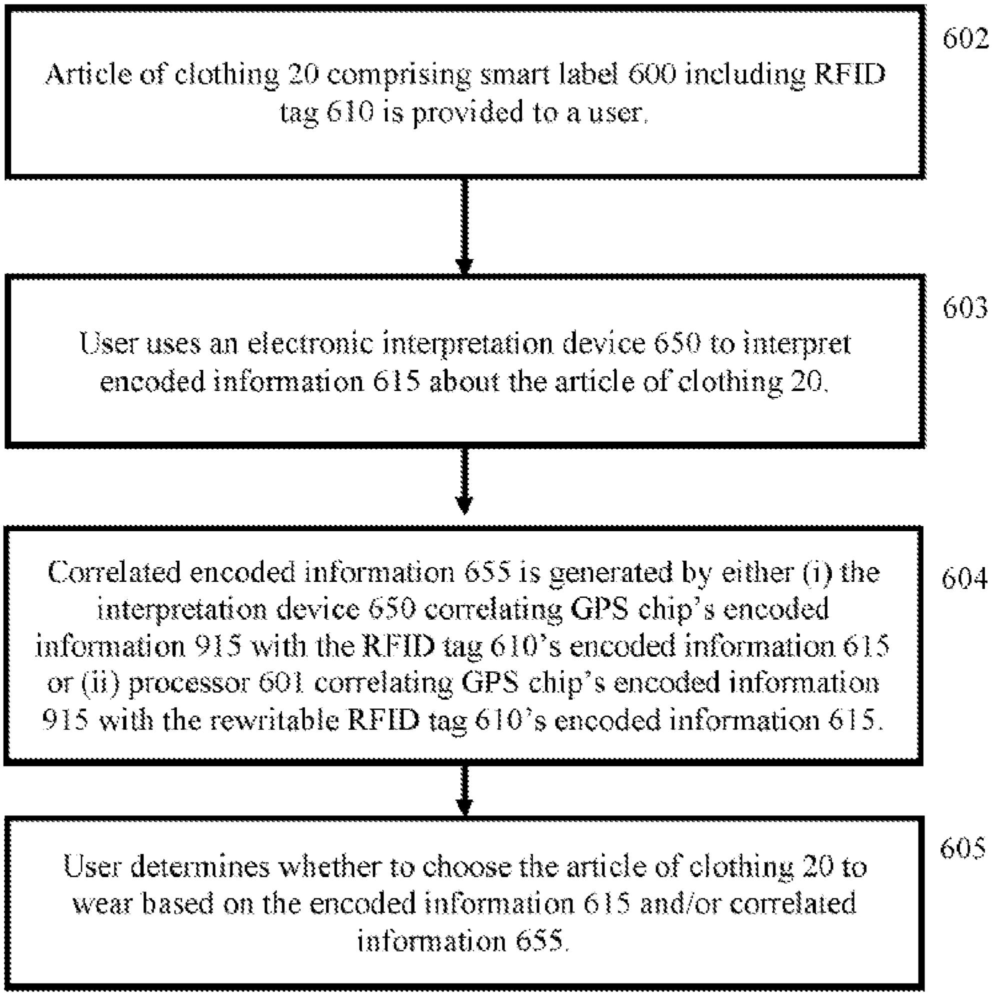
FIG. 6B is a flow chart illustrating the interpretation of information encoded in a smart label.

As shown in FIG. 6B, in an embodiment, at 602 an article of clothing 20 comprising smart label 600 including RFID tag 610 is provided to a user. At 603, the user uses an electronic interpretation device 650 to interpret encoded information 615 about the article of clothing 20. At 604, correlated encoded information 655 is generated by either (i) the interpretation device 650 correlating GPS chip's encoded information 915 with the RFID tag 610's encoded information 615 or (ii) processor 601 correlating GPS chip's encoded information 915 with the RFID tag 610's encoded information 615. At 605, the user determines whether to choose the article of clothing 20 to wear based on the encoded information 615 and/or the correlated information 655.

Figure 7:
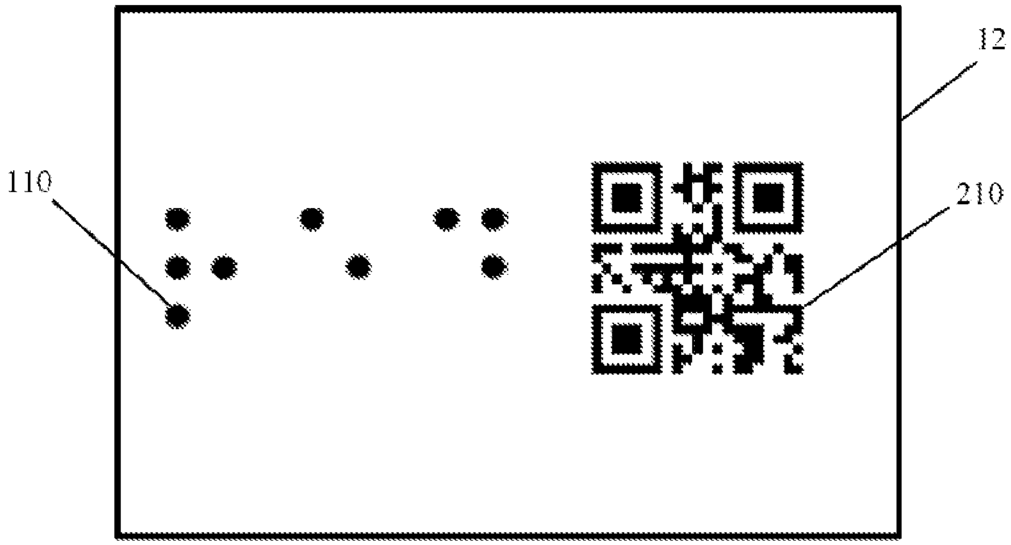
FIG. 7 is a view of a smart label comprising Braille indicia and a matrix code.

As shown in FIG. 7, in an embodiment, smart label 12 includes raised indicia (e.g., Braille) 110 and a matrix code 210.

Figure 8:
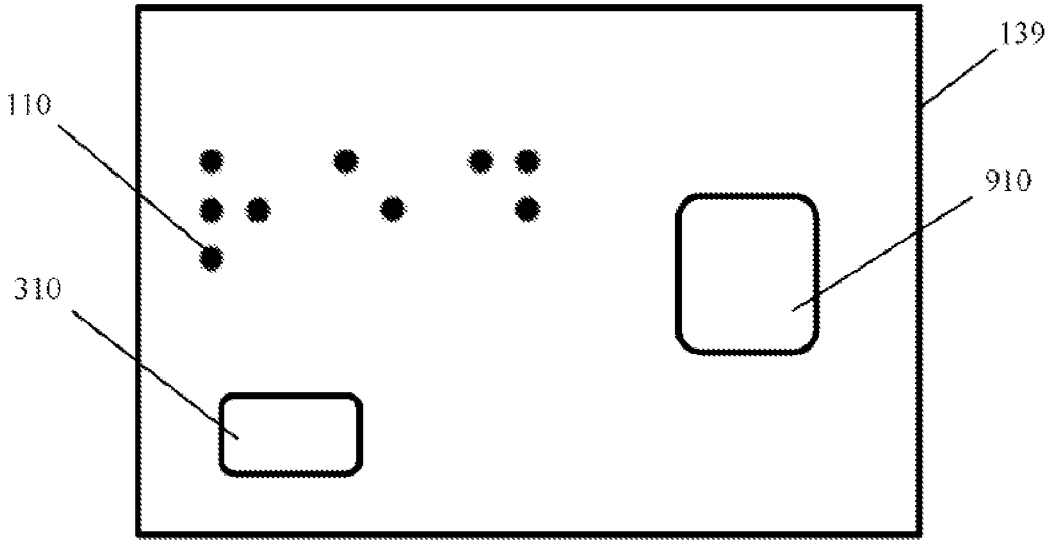
FIG. 8 is a view of a smart label comprising Braille indicia, an NFC chip, and a GPS chip.

As shown in FIG. 8, in an embodiment, smart label 139 includes raised indicia (e.g., Braille) 110, an NFC chip 310, and a GPS chip 910.

Figure 9A:
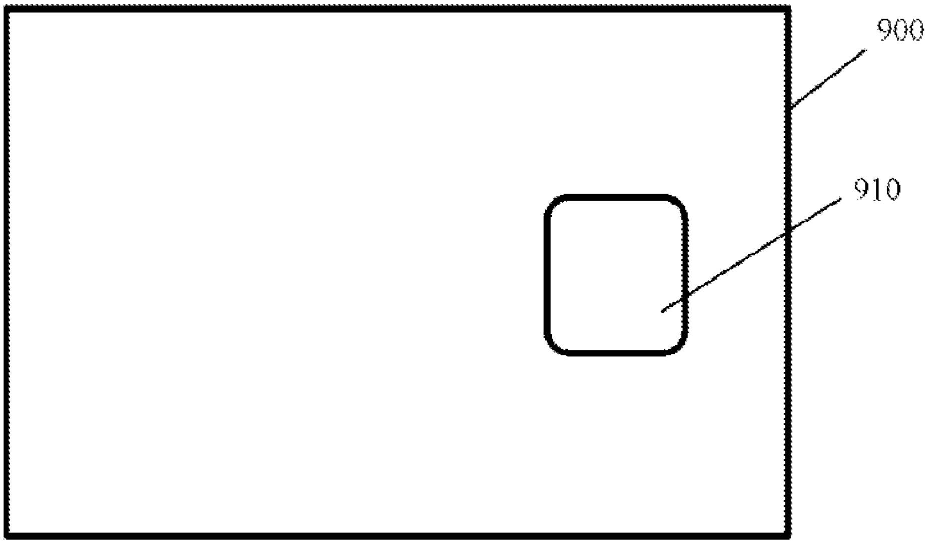
FIG. 9A is a view of a smart label comprising a GPS chip.

As shown in FIG. 9A, in an embodiment, smart label 900 includes a global positioning system component (e.g., a GPS chip) 910. In an embodiment, the GPS chip 910 can encode information 915 concerning the article of clothing 20 such as: current location, previous location, routes of travel, elevation, latitude coordinate, longitude coordinate, or combinations thereof. The GPS chip's encoded information 915 is electronically interpretable by an GPS chip interpretation device 950 as described above, e.g., a smartphone 52 comprising GPS functionality and/or a dedicated GPS communication device 59. In an embodiment, the smart label's GPS chip's encoded information 915 may be correlated with other smart label encoded information 115 by an interpretation device 50 and/or other device such as a personal computer 51 or tablet 53. In an embodiment, the correlation of information 915 with other smart label encoded information 15 may be performed automatically by the smart label 900 (or a processor 901 integrated within the smart label 900). The correlated information 955 may be accessed by a user of the interpretation device 50 to determine wear history for an article of clothing to which the smart label is affixed.

Figure 9B:
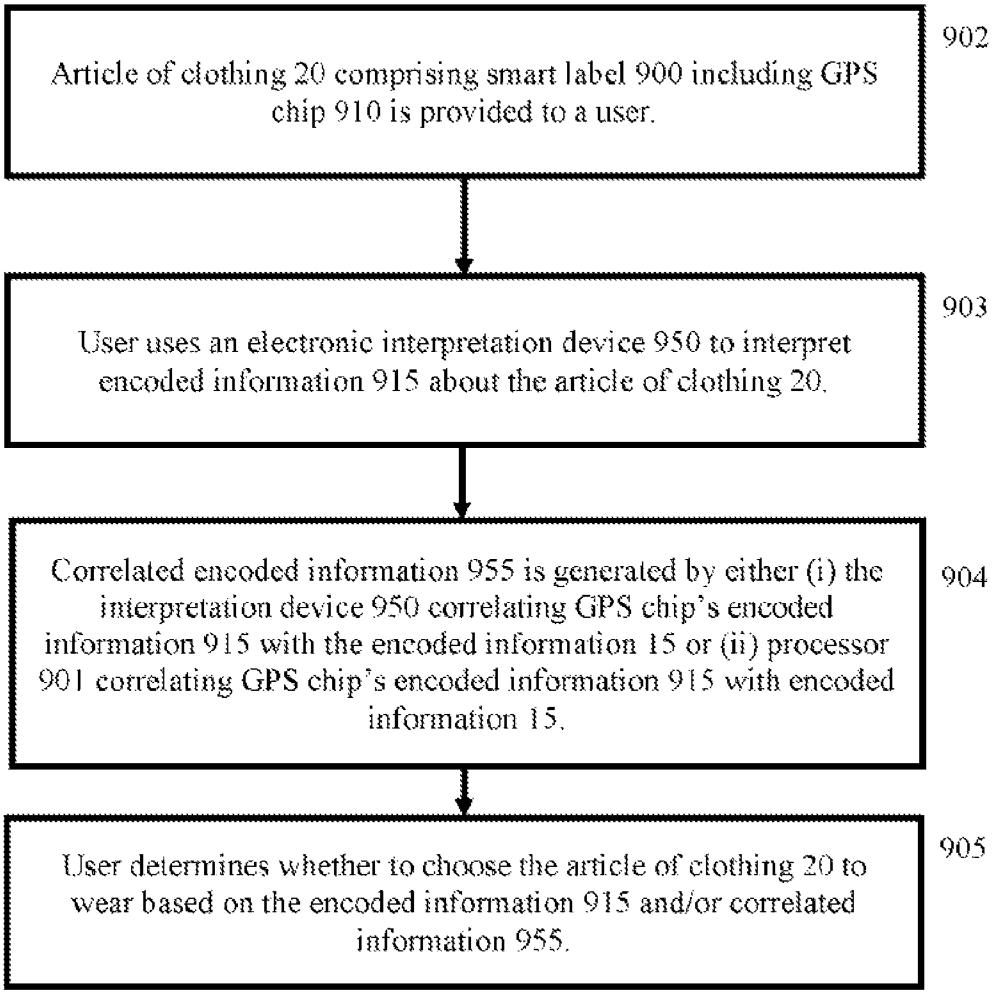
FIG. 9B is a flow chart illustrating the interpretation of information encoded in a smart label.

As shown in FIG. 9B, in an embodiment, at 902 an article of clothing 20 comprising smart label 900 including GPS chip 910 is provided to a user. At 903, the user uses an electronic interpretation device 950 to interpret encoded information 915 about the article of clothing 20. At 904, correlated encoded information 955 is generated by either (i) the interpretation device 950 correlating GPS chip's encoded information 915 with the encoded information 15 or (ii) processor 901 correlating GPS chip's encoded information 915 with encoded information 15. At 905, the user determines whether to choose the article of clothing 20 to wear based on the encoded information 915 and/or correlated information 955.

Figure 10A:
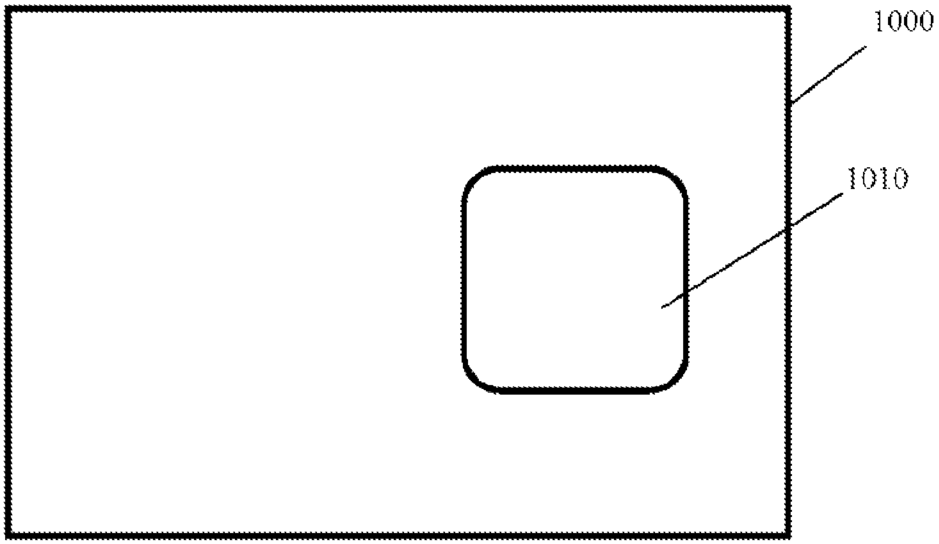
FIG. 10A is a view of a smart label comprising a microprocessor.

As shown in FIG. 10A, in an embodiment, smart label 1000 includes a microprocessor 1010. In an embodiment, the microprocessor 1010 can encode information 1015 concerning the article of clothing 20 such as: color, size, style, appearance (e.g., images, symbols, and/or verbiage present on article), cleaning and/or laundering instructions, designer, manufacturer, merchant, place of purchase, country of origin, or combinations thereof. The microprocessor's encoded information 1015 is electronically interpretable by an interpretation device 1050 as described above, e.g., a smartphone 52 or tablet 53. The microprocessor's encoded information 1015 may be modified or deleted via the use of a programmer/encoder as is known to those of ordinary skill in the art. In an embodiment, a user may modify the microprocessor's encoded information 1015 to encode correlated information 1055 comprising article of clothing wear history information (e.g., GPS chip's encoded information 915) which is correlated with article of clothing color, size, style, appearance (e.g., images, symbols, and/or verbiage present on article), cleaning and/or laundering instructions, designer, manufacturer, merchant, place of purchase, country of origin, or combinations thereof information 1015. In an embodiment, the correlated information 1055 may be correlated by an interpretation device 50 and/or other device such as a personal computer 51 or tablet 53. In an embodiment, the correlated information 1055 may be programmed/encoded onto the microprocessor 1010 by the interpretation device 1050 and/or other device such as a personal computer 51 or tablet 53. In an embodiment, the correlated information 1055 may be correlated automatically by the smart label 1000 (or a processor 1001 integrated within the smart label 1000). In an embodiment, the correlated information 1055 may be encoded onto microprocessor 1010 automatically by the smart label 1000 (or a processor 1001 integrated within the smart label 1000). The correlated information 1055 may be accessed by a user of the interpretation device 1050 to determine wear history for an article of clothing 20 to which the smart label 1000 is affixed.

Figure 10B:
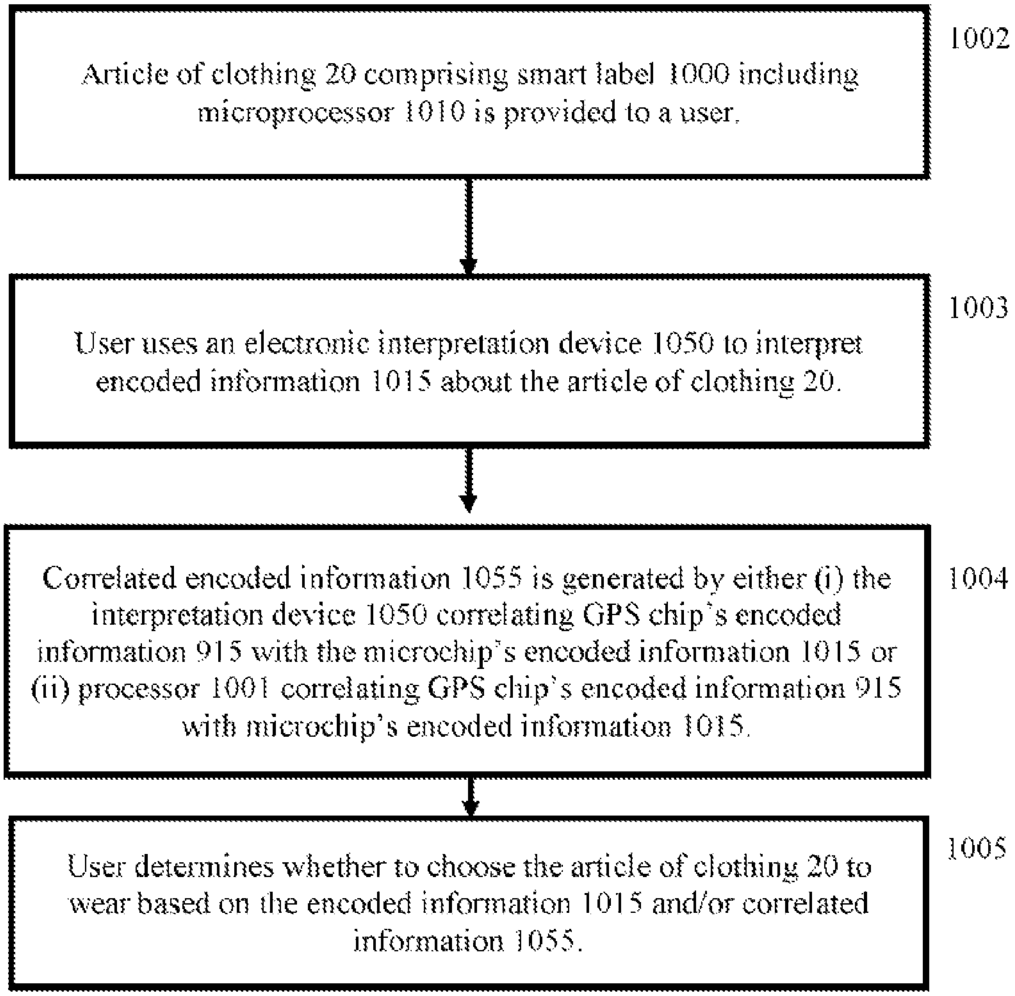
FIG. 10B is a flow chart illustrating the interpretation of information encoded in a smart label.

As shown in FIG. 10B, in an embodiment, at 1002 an article of clothing 20 comprising smart label 1000 including microprocessor 1010 is provided to a user. At 1003, the user uses an electronic interpretation device 1050 to interpret encoded information 1015 about the article of clothing 20. At 1004, correlated encoded information 1055 is generated by either (i) the interpretation device 1050 correlating GPS chip's encoded information 915 with the microchip's encoded information 1015 or (ii) processor 1001 correlating GPS chip's encoded information 915 with microchip's encoded information 1015. At 1005, the user determines whether to choose the article of clothing 20 to wear based on the encoded information 1015 and/or correlated information 1055.

Figure 11A:
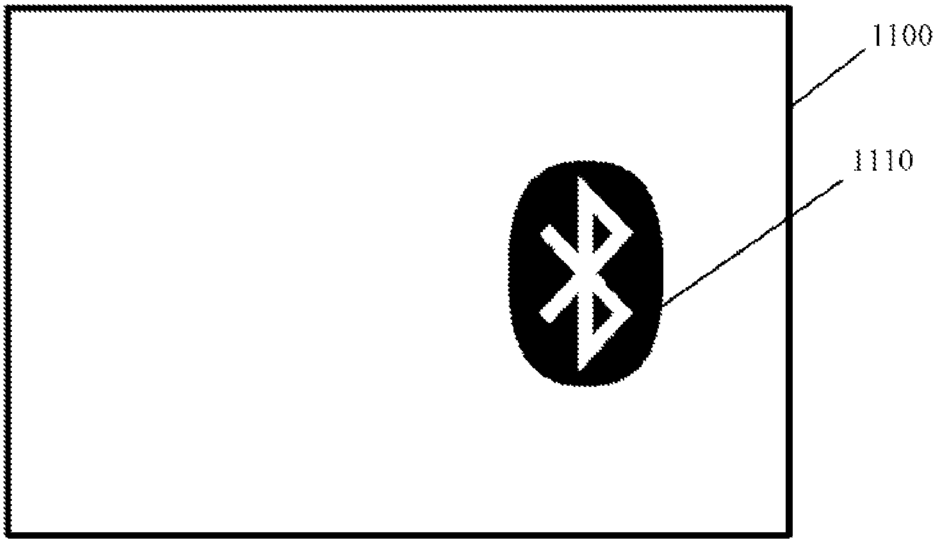
FIG. 11A is a view of a smart label comprising Bluetooth technology.

As shown in FIG. 11A, in an embodiment, smart label 1100 includes Bluetooth technology 1110. In an embodiment, the Bluetooth technology 1110 can encode information 1115 concerning the article of clothing 20 such as: color, size, style, appearance (e.g., images, symbols, and/or verbiage present on article), cleaning and/or laundering instructions, designer, manufacturer, merchant, place of purchase, country of origin, or combinations thereof. The Bluetooth technology's encoded information 1115 is electronically interpretable by an interpretation device 1150 as described above, e.g., a smartphone 52 or tablet 53. The Bluetooth technology's encoded information 1115 may be modified or deleted via the use of a programmer/encoder as is known to those of ordinary skill in the art. In an embodiment, a user may modify the Bluetooth technology's encoded information 1115 to encode correlated information 1155 comprising article of clothing wear history information (e.g., GPS chip's encoded information 915) which is correlated with article of clothing color, size, style, appearance (e.g., images, symbols, and/or verbiage present on article), cleaning and/or laundering instructions, designer, manufacturer, merchant, place of purchase, country of origin, or combinations thereof information 1115. In an embodiment, the correlated information 1155 may be correlated by an interpretation device 1150 and/or other device such as a personal computer 51 or tablet 53. In an embodiment, the correlated information 1155 may be programmed/encoded onto the Bluetooth technology 1110 by the interpretation device 1150 and/or other device such as a personal computer 51 or tablet 53. In an embodiment, the correlated information 1155 may be correlated automatically by the smart label 1100 (or a processor 1101 integrated within the smart label 1100). In an embodiment, the correlated information 1155 may be encoded into the Bluetooth technology 1110 automatically by the smart label 1100 (or a processor 1101 integrated within the smart label 1100). The correlated information 1155 may be accessed by a user of the interpretation device 50 to determine wear history for an article of clothing 20 to which the smart label 1100 is affixed.

Figure 11B:
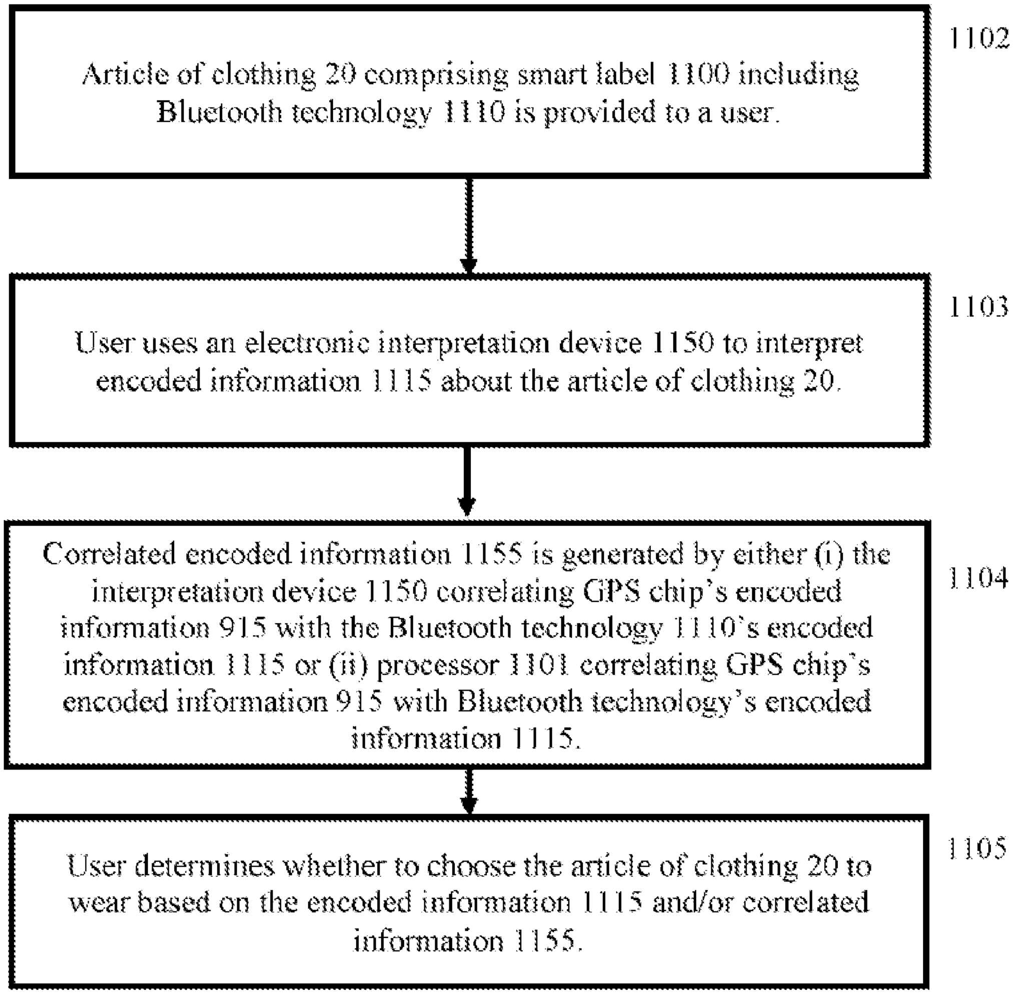
FIG. 11B is a flow chart illustrating the interpretation of information encoded in a smart label.

As shown in FIG. 11B, in an embodiment, at 1102 an article of clothing 20 comprising smart label 1100 including Bluetooth technology 1110 is provided to a user. At 1103, the user uses an electronic interpretation device 1150 to interpret encoded information 1115 about the article of clothing 20. At 1104, correlated encoded information 1155 is generated by either (i) the interpretation device 1150 correlating GPS chip's encoded information 915 with the Bluetooth technology 1110's encoded information 1115 or (ii) processor 1101 correlating GPS chip's encoded information 915 with Bluetooth technology's encoded information 1115. At 1105, the user determines whether to choose the article of clothing 20 to wear based on the encoded information 1115 and/or correlated information 1155.

Figure 12:
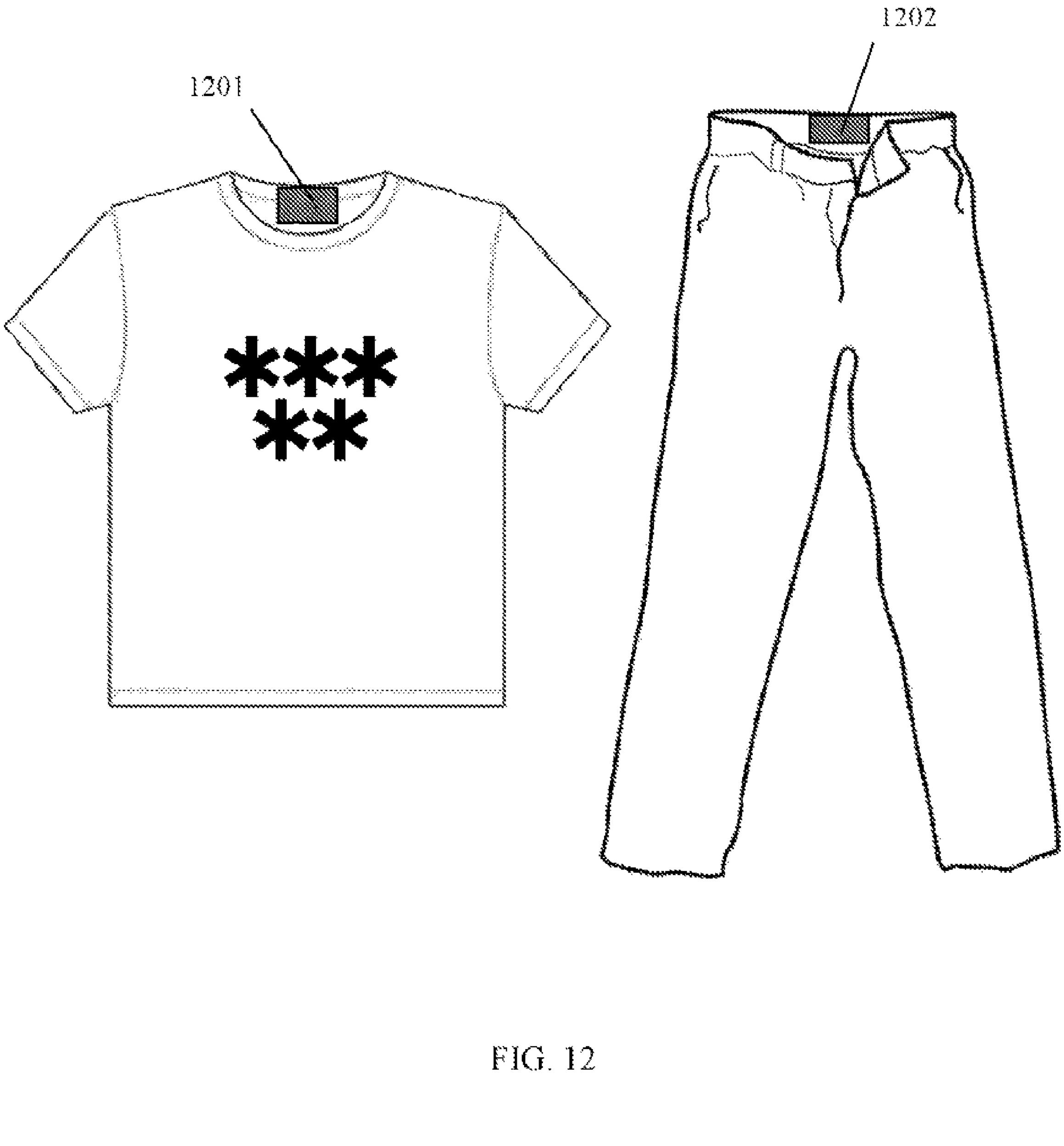
FIG. 12 is a view of articles of clothing having a smart labels attached in accordance with the present disclosure.

As shown in FIG. 12, in an embodiment, smart label 1201 is attached to a concert t-shirt (with politically incorrect language displayed thereon) and smart label 1202 is attached to a pair of jeans. The ability to specifically identify an article of clothing can be particularly useful on the occasion when the wearer may know that the wearer will be attending a function and/or locale where certain articles of clothing may not meet the predominant political, social, and/or moral mores. For example, a Bernie Sanders supporter may not want to unintentionally wear a Bernie Sanders t-shirt to a Donald Trump rally, a Dallas Cowboys fan may not want to unintentionally wear a Cowboys t-shirt to a game at Philadelphia's Lincoln Financial Field, and a rock concert goer may not want to unintentionally wear a concert t-shirt to a church service. The instantly disclosed smart label system will allow each of these individuals to specifically identify their articles of clothing (e.g. not just what color, but exactly what the article of clothing is and/or comprises) so that the wearer may decide if a specific article of clothing is appropriate for the circumstances.

Figure 13:
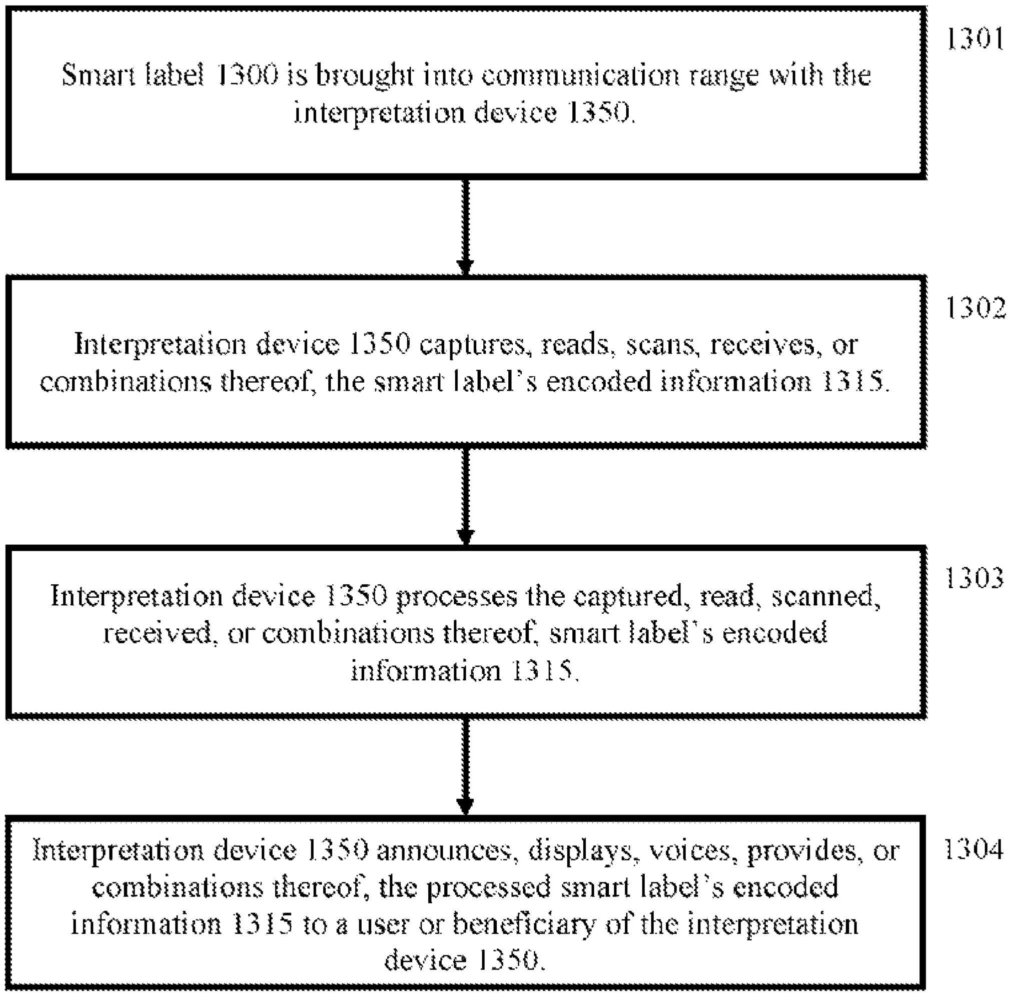
FIG. 13 is a flow chart illustrating the interpretation of information encoded in a smart label.

As shown in FIG. 13, in an embodiment, a smart label 1300 comprises encoded information 1315 which may be interpreted by an interpretation device 1350. At 1301, the smart label 1300 is brought into communication range with the interpretation device 1350. At 1302, the interpretation device 1350 captures, reads, scans, receives, or combinations thereof, the smart label's encoded information 1315. At 1303, the interpretation device 1350 processes the captured, read, scanned, received, or combinations thereof, smart label's encoded information 1315. At 1304, the interpretation device 1350 announces, displays, voices, provides, or combinations thereof, the processed smart label's encoded information 1315 to a user or beneficiary of the interpretation device 1350.

Figure 14:
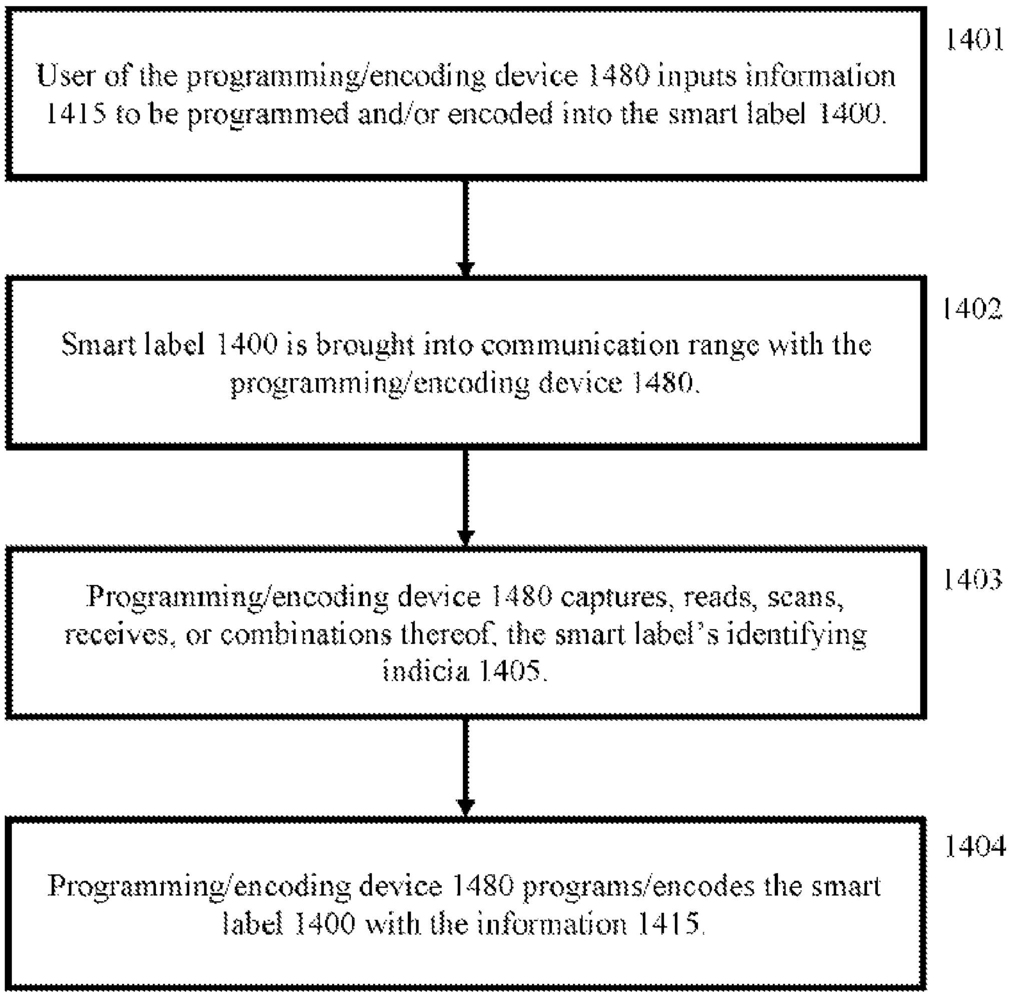
FIG. 14 is a flow chart illustrating the programming and/or encoding of information encoded in a smart label.

As shown in FIG. 14, in an embodiment, a smart label 1400 may be programmed and/or encoded with information 1415 via a programming/encoding device 1480. At 1401, a user of the programming/encoding device 1480 inputs information 1415 to be programmed and/or encoded into the smart label 1400. At 1402, the smart label 1400 is brought into communication range with the programming/encoding device 1480. At 1403, the programming/encoding device 1480 captures, reads, scans, receives, or combinations thereof, the smart label's identifying indicia 1405. At 1404, the programming/encoding device 1480 programs/encodes the smart label 1400 with the information 1415.

Figure 15:
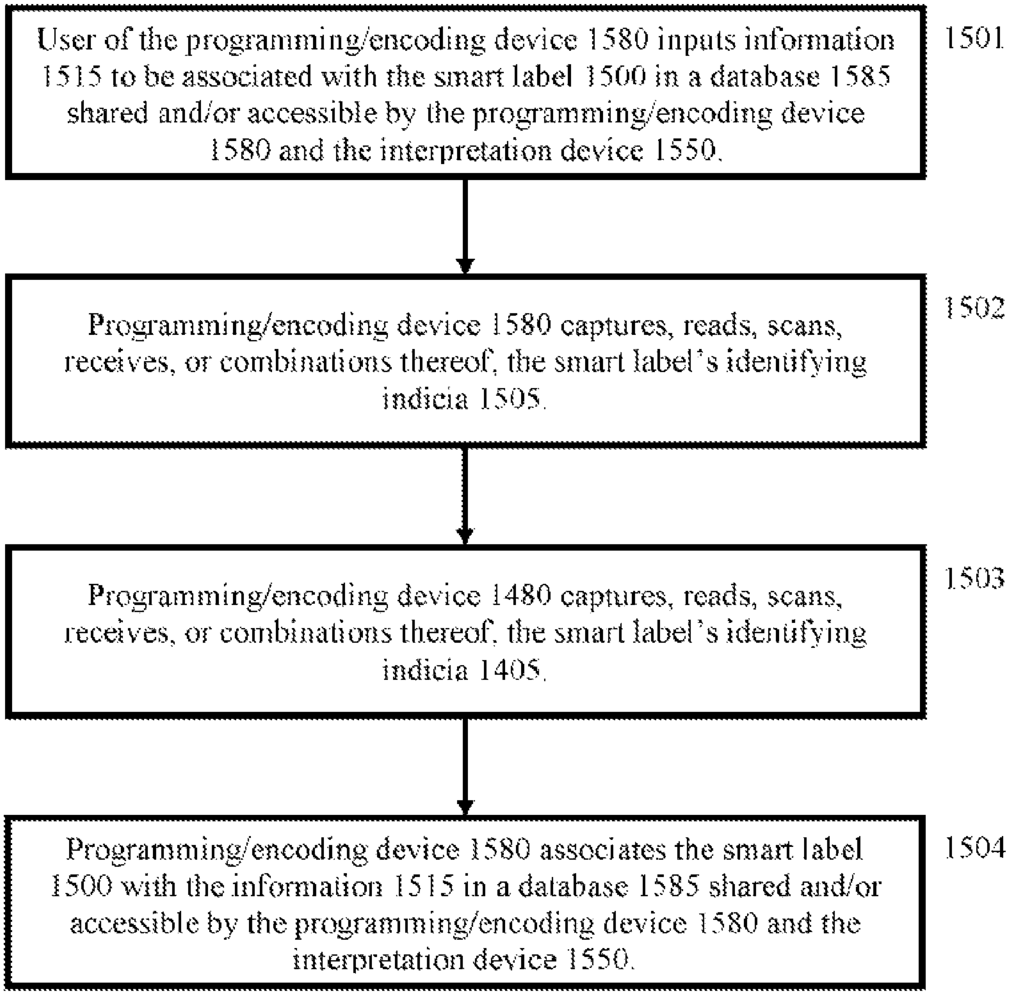
FIG. 15 is a flow chart illustrating the association of information with smart label in a database.

As shown in FIG. 15, in an embodiment, a smart label 1500 may be associated with information 1515 input by a user of the programming/encoding device 1580. At 1501, a user of the programming/encoding device 1580 inputs information 1515 to be associated with the smart label 1500 in a database 1585 shared and/or accessible by the programming/encoding device 1580 and the interpretation device 1550. At 1502, the smart label 1500 is brought into communication range with the programming/encoding device 1580. At 1503, the programming/encoding device 1580 captures, reads, scans, receives, or combinations thereof, the smart label's identifying indicia 1505. At 1504, the programming/encoding device 1580 associates the smart label 1500 with the information 1515 in a database 1585 shared and/or accessible by the programming/encoding device 1580 and the interpretation device 1550.

While particular embodiments of the present invention have been illustrated and described, it is not intended to limit the invention, except as defined by the following claims. One of ordinary skill in the art will appreciate that the disclosed smart labels, information conveyors, and interpretation devices may be combined in numerous different embodiments comprising differing types and amounts of information conveyors being associated on a single smart label with multiple interpretation devices capable of interpreting the encoded/associated information of the smart label. For example, in an embodiment, a smart label could comprise all information conveyors. In an embodiment, a smart label could comprise a single information conveyor. In alternative embodiments, a smart label could comprise any number and/or combination of information conveyors as a matter of design choice. Moreover, one of ordinary skill in the art would understand the interpretation devices to employ based on the type, number, and/or combination of information conveyors comprising a smart label.

I claim:

1. A smart label system, comprising a programmable label, wherein the programmable label is configurable for affixing to an article of clothing and automatically correlating information related to the article of clothing; and a plurality of interpretable components; wherein the plurality of interpretable components comprise information, wherein the information is encoded and/or associated with article of clothing data, wherein the plurality of interpretable components comprises raised indicia, a GPS chip, an NFC chip, a processor, Bluetooth technology, or combinations thereof, wherein the programmable label comprises the raised indicia, wherein the raised indicia comprises lettering, and wherein the raised indicia comprises only a subset of the information encoded and/or associated with the GPS chip, the NFC chip, an RFID tag, the processor, the Bluetooth technology, or combinations thereof.

2. The smart label system of claim 1, further comprising an interpretation device.

3. The smart label system of claim 2, wherein the interpretation device comprises a personal computer, a smartphone, a computer tablet, a smart code reader, a GPS device, an NFC communicator, an RFID reader, a magnetic stripe reader, a Bluetooth communicator, or combinations thereof.

4. The smart label system of claim 1, wherein the encoded information is interpretable tactually, electronically, or both.

5. The smart label system of claim 4, wherein the encoded information is user modifiable.

6. The smart label system of claim 1, further comprising a smart label programming device, wherein the smart label programming device encodes the encoded information onto the smart label.

7. The smart label system of claim 1, wherein the programmable label is removable and reaffixable.

8. A smart label system, comprising: a programmable label, wherein the programmable label is configurable for affixing to an article of clothing and automatically correlating information related to the article of clothing; and a plurality of interpretable components; wherein the plurality of interpretable components comprise information, wherein the information is encoded and/or associated with article of clothing data, wherein the plurality of interpretable components comprises raised indicia, a GPS chip, an NFC chip, a processor, Bluetooth technology, or combinations thereof, wherein the programmable label comprises the raised indicia, wherein the raised indicia comprises Braille, and wherein the raised indicia comprises only a subset of the information encoded and/or associated with the GPS chip, the NFC chip, an RFID tag, the processor, the Bluetooth technology, or combinations thereof.

9. The smart label system of claim 8, further comprising an interpretation device.

10. The smart label system of claim 9, wherein the interpretation device comprises a personal computer, a smartphone, a computer tablet, a smart code reader, a GPS device, an NFC communicator, an RFID reader, a magnetic stripe reader, a Bluetooth communicator, or combinations thereof.

11. The smart label system of claim 8, wherein the encoded information is interpretable tactually, electronically, or both.

12. The smart label system of claim 11, wherein the encoded information is user modifiable.

13. The smart label system of claim 8, further comprising a smart label programming device, wherein the smart label programming device encodes the encoded information onto the smart label.

14. The smart label system of claim 8, wherein the programmable label is removable and reaffixable.

15. A smart label system, comprising:

a programmable label, wherein the programmable label is configurable for affixing to an article of clothing and automatically correlating information related to the article of clothing; and a plurality of interpretable components; wherein the plurality of interpretable components comprise information, wherein the information is encoded and/or associated with article of clothing data, wherein the plurality of interpretable components comprises raised indicia, a GPS chip, an NFC chip, a processor, Bluetooth technology, or combinations thereof, wherein the programmable label comprises the raised indicia, wherein the raised indicia comprises Braille and lettering, and wherein the raised indicia comprises only a subset of the information encoded and/or associated with the GPS chip, the NFC chip, an RFID tag, the processor, the Bluetooth technology, or combinations thereof.

16. The smart label system of claim 15, further comprising an interpretation device.

17. The smart label system of claim 16, wherein the interpretation device comprises a personal computer, a smartphone, a computer tablet, a smart code reader, a GPS device, an NFC communicator, an RFID reader, a magnetic stripe reader, a Bluetooth communicator, or combinations thereof.

18. The smart label system of claim 15, wherein the encoded information is interpretable tactually, electronically, or both.

19. The smart label system of claim 18, wherein the encoded information is user modifiable.

20. The smart label system of claim 15, further comprising a smart label programming device, wherein the smart label programming device encodes the encoded information onto the smart label.

21. The smart label system of claim 15, wherein the programmable label is removable and reaffixable.

* * * * *